United States Patent [19]

Robinson

[11] Patent Number: 5,790,426
[45] Date of Patent: Aug. 4, 1998

[54] AUTOMATED COLLABORATIVE FILTERING SYSTEM

[75] Inventor: Gary B. Robinson, Ellsworth, Me.

[73] Assignee: Athenium L.L.C., Cambridge, Mass.

[21] Appl. No.: 848,317

[22] Filed: Apr. 30, 1997

Related U.S. Application Data

[63] Continuation-in-part of Ser. No. 838,233, Apr. 15, 1997.

[60] Provisional application No. 60/016,577 Apr. 30, 1996.

[51] Int. Cl.⁶ .................................................. G06F 19/00
[52] U.S. Cl. ............................ 364/554; 364/286; 705/10; 705/6; 705/27
[58] Field of Search .................. 705/27–29, 10, 705/6; 707/1, 3; 364/253.1, 282.1, 286, 554, DIG. 1, 553, 555; 273/161; 395/187.01, 188.01

[56] References Cited

U.S. PATENT DOCUMENTS

| | | | |
|---|---|---|---|
| 4,870,579 | 9/1989 | Hey | 705/27 |
| 4,996,642 | 2/1991 | Hey | 705/27 |
| 5,530,853 | 6/1996 | Schell et al. | 364/253.1 |
| 5,559,949 | 9/1996 | Reimer et al. | 707/3 |
| 5,676,138 | 10/1997 | Zawilinski | 128/905 |
| 5,684,951 | 11/1997 | Goldman | 395/188.01 |

OTHER PUBLICATIONS

Upendra Shardanand, "Social Information Filtering for Music Recommendation" Sep. 1994, pp. 1–93, Massachusetts Institute of Technology, Thesis.

"WWW.firefly.com", web site pages, 12 pages, printed out on Jan. 21, 1998 (origination date unknown).

"WWW.amazon.com", web site pages, 15 pages, printed out on Jan. 21, 1998 (origination date unknown).

Primary Examiner—James P. Trammell
Assistant Examiner—Bryan Bui
Attorney, Agent, or Firm—Nutter, McClennen & Fish, LLP

[57] ABSTRACT

An automated collaborative filtering (ACF) system for recommending at least one item to a first user based on similarity in preference of the user as compared with other users. The ACF system stores rating data for items provided by users of the system. Upon request of the first user, the system determines similarity values for the first user as compared with other users that have provided rating data for items that the first user has also rated. Based on the similarity values, a subgroup of users is selected that is then used to provide recommendations to the first user.

5 Claims, 7 Drawing Sheets

AUTOMATED COLLABORATIVE FILTERING SYSTEM

CROSS REFERENCE TO RELATED APPLICATION

This application claims priority from U.S. Provisional Application No. 60/016,577 filed on Apr. 30, 1996, herein incorporated by reference and is a continuation-in-part of U.S. application Ser. No. 08/838,233, entitled AUTOMATED COLLABORATIVE FILTERING SYSTEM, filed Apr. 15, 1997 and having named inventor Gary B. Robinson.

APPENDIX

This application includes a computer program appendix.

STATEMENT REGARDING FEDERALLY SPONSORED RESEARCH

Not Applicable.

FIELD OF THE INVENTION

The present invention relates to a system and method of providing recommendations and more particularly, to a system and method of providing a recommendation of a at least one item to a user based on the similarity of preferences of the user and other users.

BACKGROUND OF THE INVENTION

The enjoyment or dislike of particular goods and services is a subjective judgment made by individuals based on any number of criteria. The ability to make reliable recommendations to a particular person for a given item, such as a movie for example, would be useful. Such information would enable someone to avoid such items that would not be enjoyable and choose such items as would be pleasing.

There is often information of how well received an item is with respect to the general population, such as a popular movie or book. However, such information does not provide a means to determine to what extent or even if a particular individual will like the movie, or book. Such generalized information only provides the likelihood that a randomly selected individual will appreciate a particular item such as a given movie.

There are many critics that rate movies and the like. An individual can try to identify such a critic with preferences that are at least somewhat similar after much experimentation, time and money spent viewing movies. However, such a process is neither reliable nor repeatable on a regular basis and does not take into account particular likes and dislikes.

There exists, however, a class of systems referred to as automated collaborative filtering (ACF) systems which provide recommendations to a user based on ratings of items by other system users. ACF systems include the entry and storage of ratings data by users of the system to generate customized ratings. The ratings of items stored in the system reflect an individual user's personal tastes. An ACF system attempts to find users with similar preferences as a particular user and provide recommendations to that user based on those similar preferences.

As mentioned above, prior art ACF systems have attempted to provide recommendations to a user based on ratings for items provided by the user as compared with other users. See for example U.S. Pat. No. 4,996,642 to Hey and 1994 MIT Media Lab Master's Degree thesis of Upendra Shardanand. However, these recommendation systems fail to take into account the probability that a random user will provide a given rating. Thus, information showing unusual similarity in preferences for particular users is not utilized. Furthermore, these prior art systems also do not provide recommendations with statistically meaningful confidence levels as the number of items that both the user and a respective recommending user have provided ratings for increases.

SUMMARY OF THE INVENTION

In accordance with the present invention, a method for providing a recommendation of at least one item in a group of items to a first user in a group of users based on rating of the item and other items in the group of items by other users in the group and rating of at least some of the other items by the first user includes the steps of providing ratings data for each item in the group of items from at least some of the users in the group of users, determining a respective similarity value for the first user with respect to other users in the group, determining a subgroup containing the first user and at least one other user in the group of users based on the similarity of ratings of the first user and the at least one other user and providing the recommendation of at least one item in the group of items to the first user based on the ratings of the at least one item of the subgroup provided by the other users in the subgroup. With this particular arrangement an automated collaborative filtering (ACF) which utilizes both ratings and probability values is provided. By utilizing probability values, recommendations can be made to users having similar preferences to a relatively small subgroup of users who have rated a particular item. The invention provides a method for providing a recommendation of an item to a user based on the similarity of preferences of the user and other users. The method is provided as part of an ACF system which provides a recommendation of at least one item in a group of items to a first user in a group of users based on ratings of the item and other items in the group of items by other users in the group and ratings of at least some of the other items by the first user. In order to provide the recommendation, rating data is provided for each item in the group of items from at least some of the users in the group of users. A respective similarity value is determined for the first user as compared with each of the other users in the group by consecutively comparing the ratings of the first user of a respective item in the group of items with the ratings of each of the other users in the group that have provided ratings for the respective item. The similarity values are determined in a way that includes taking into consideration the probability of what rating a random user would provide for a respective item. After computing the similarity values, a subgroup is determined containing the first user and at least one other user in the group of users based on the similarity of ratings of the first user and the at least one other user. A recommendation of at least one item in the group of items is provided to the first user based on the ratings of the at least one item of the subgroup provided by the other users in the subgroup.

BRIEF DESCRIPTION OF THE DRAWINGS

The foregoing features of this invention as well as the invention itself may be more fully understood from the following detailed description of the drawings, in which.

DETAILED DESCRIPTION OF THE INVENTION

Figure 1:
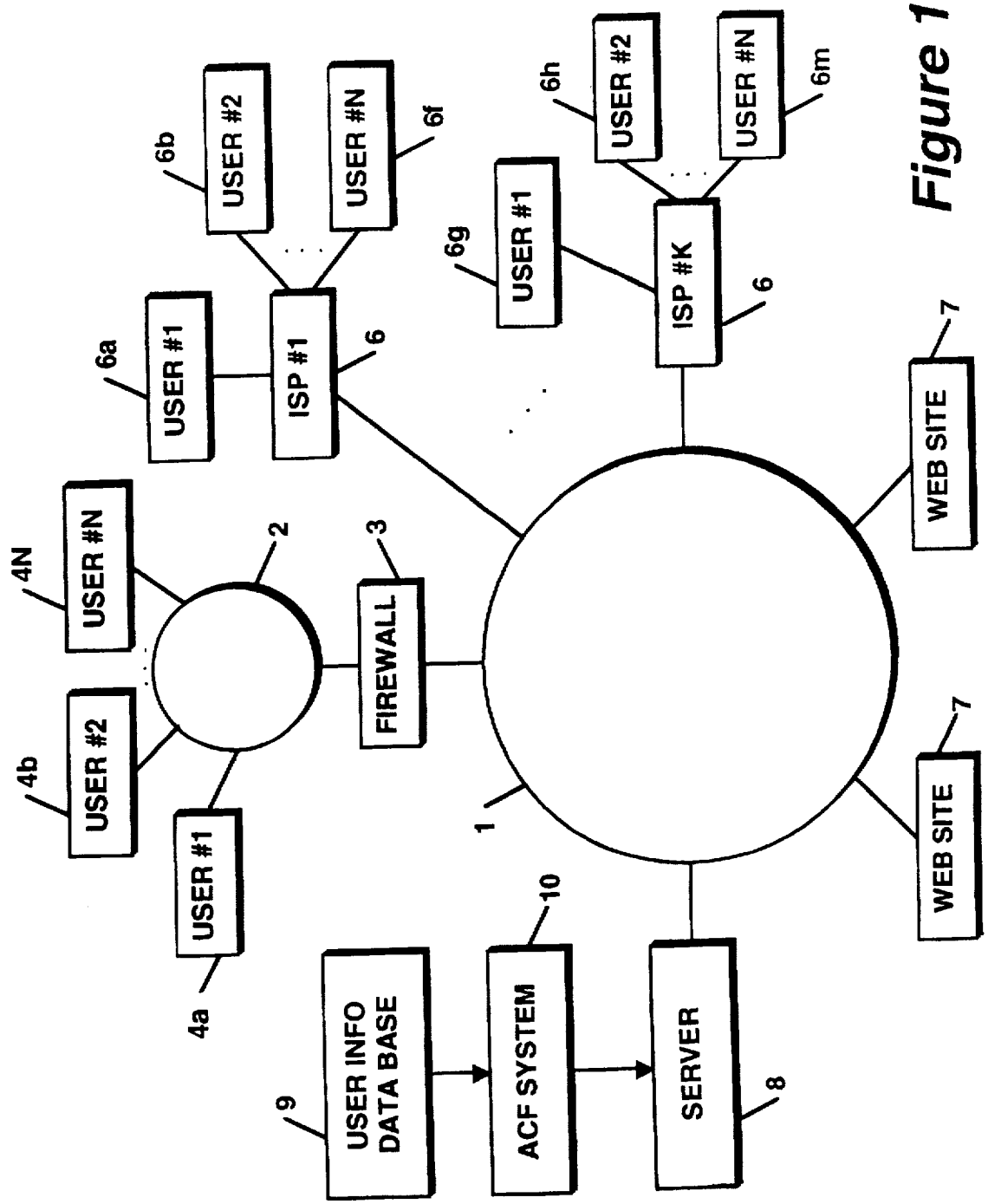
FIG. 1 is a block diagram of a system which includes an automated collaboration filter.

The following description sets forth an exemplary embodiment, in accordance with the present invention, of an automated collaborative filtering (ACF) system for providing a recommendation of an item within a group of items to a user based on that user's similarity of preferences as compared with a subgroup of users of the system. For purposes of illustration, the ACF system and associated methods are described herein in the context of recommending a movie. It should be understood of course that the ACF system is not limited to recommending movies. Rather, the ACF system of the present invention can be used to recommend any product or service that can be rated by a user of that product or service.

The invention will be described in conjunction with various terms and statistical tools defined below. In the field of statistics, a traditional way to measure the evidence is to start with a null hypothesis, usually labeled Ho, and to calculate the confidence with which the null hypothesis can be rejected. For example, starting with the following null hypothesis, which applies to one movie seen by both Joe and the other user: $H_0$=The two users have no unusual similarity of taste relative to movies like the current one.

If, two users had an unusual similarity of taste, such an unusual similarity of taste would be manifested in the form of unusually similar ratings in a user information database. Now, looking at that data, one can ask: What is the likelihood that the two users would agree at least as much as the data shows them to if the null hypothesis were true? For instance, what is the likelihood that the two users discussed above would have agreed on all of three movies if they had no fundamental tendency to rate movies the same way? This kind of likelihood is called a p-value. P-values provide a tool to deal with numeric quantities rather than with vague terms such as similarity of taste. One definition for p-value, also referred to as an observed significance level, for a specific statistical test is the probability, assuming a null hypothesis $H_0$ to be true, of observing a value of the test statistic that is at least as contradictory to the null hypothesis as the one computed from the sample data. Equivalently, the p-value p is a measure of the confidence with which one can reject the null hypothesis $H_0$. If the p-value p is very small, one can reject the null hypothesis $H_0$ with confidence, and assume, instead, that the two users do probably have similarity of taste. An alternative explanation is that he p-value p is a measure of the amount of evidence that there is similarity of taste between two users. A lower value for the p-value p means we have more evidence.

The ACF system and methods of the present invention can be implemented on any suitable computer and associated components, peripherals, keyboards, and the like, as known to one of ordinary skill in the art. Ratings data is provided to the system in a suitable fashion. For example, each user can enter data into a database by keyboard, touch screen, voice, or other means. The ratings data can be one rating for one item or, the item can be rated on a number of criteria that can be blended or individually accessible. Without limiting the invention to that recited, the system can be used in conjunction with the Internet, kiosks, or interactive television.

Referring now to FIG. 1, a public network or Internet 1 is coupled to a private network 2 through a fire wall server 3. Coupled to private network 2 are a plurality of users 4a-4N generally denoted 4. As used herein, the term "internet" generally refers to any collection of distinct networks working together to appear as a single network to a user. The term "Internet", on the other hand, refers to the so-called world wide "network of networks" that are connected to each other using the Internet protocol (IP) and other similar protocols. The Internet provides file transfer, remote log in, electronic mail, news and other services.

As described herein, the exemplary public network of FIG. 1 is for descriptive purposes only. Although the description may refer to terms commonly used in describing particular public networks such as the Internet, the description and concepts equally apply to other public and private computer networks, including systems having architectures dissimilar to that shown in FIG. 1.

One of the unique aspects of the Internet system is that messages and data are transmitted through the use of data packets referred to as "data grams." In a data gram based network, messages are sent from a source to a destination in a manner similar to a government mail system. For example, a source computer may send a data gram packet to a destination computer regardless of whether or not the destination computer is currently powered on and coupled to the network. The Internet protocol (IP) is completely sessionless, such that IP data gram packets are not associated with one another.

The fire wall server 3 is a computer which couples the computers of a private network e.g. network 2 to the Internet 1. Firewall Server 3 may thus act as a gatekeeper for messages and data grams going to and from the Internet 1.

An Internet service provider 6 is also coupled to the Internet 1. A service provider is an organization that provides connections to a part of the Internet. Internet service provider 6 is also a computer which couples a plurality of users 6a-6m to the Internet 1. Thus, users 6a-6m are coupled to the Internet through Internet service provider 6. Also coupled to the Internet 1 are a plurality of web sites or nodes 7. When a user wishes to conduct a transaction at one of the nodes 7, the user accesses the node 7 through the Internet 1.

Each node in the fire wall shown in FIG. 1 is configured to understand which fire wall and node to send data packets to given a destination IP address. This may be implemented by providing the fire walls and nodes with a map of all valid IP addresses disposed on its particular private network or another location on the Internet. The map may be in the form of prefix matches up to and including the full IP address.

Also coupled to Internet 1 is a server 8, a user information database 9 and an automated collaborative filtering (ACF) system 10. User 6 ratings data for items can be stored in database 9. The information need only be stored once. The information may be stored, for example, as a record or as a file. The information for each particular item rated by a user is stored in a particular data structure in database 9.

Database 9 and ACF system 10 may be provided, for example, as an object-oriented database management system (DBMS), a relational database management system (e.g.

DB2, SQL, etc.) or another conventional database package. Thus, the database 9 can be implemented using object-oriented technology or via text files.

Figure 2:
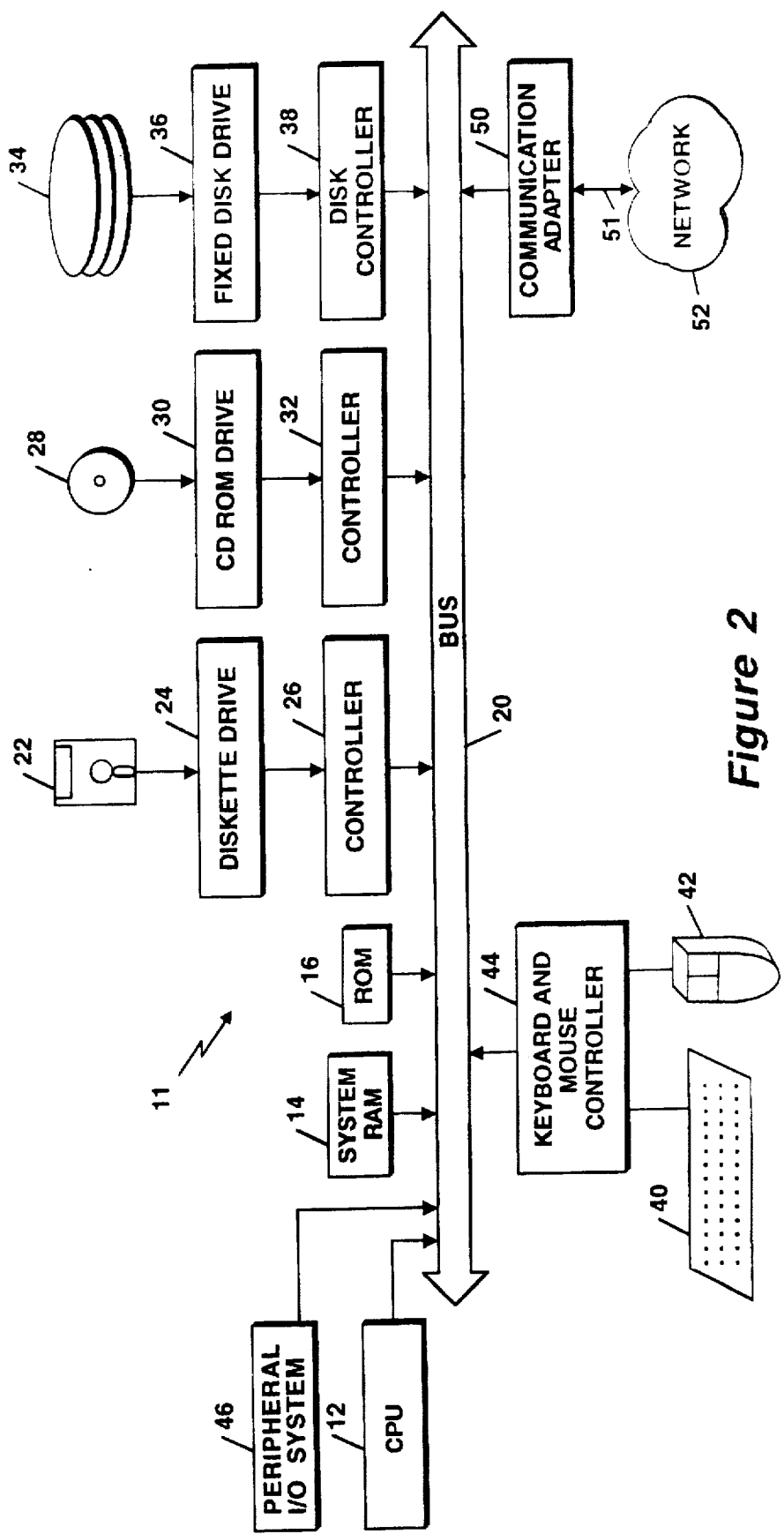
FIG. 2 is a block diagram of an illustrative implementation of a computer system on which the automated collaborative filtering system maybe implemented.

Referring now to FIG. 2, a computer system 11 on which the ACF system of the present invention may be implemented is shown. Computer system 11 may be provided, for example, as an IBM compatible computer or an equivalent computer system. The exemplary computer system 11 of FIG. 2 is for descriptive purposes only. Although the description may refer to terms commonly used in describing particular computer systems, the description and concepts equally apply to other processing systems, including systems having architectures dissimilar to that shown in FIG. 2.

Computer system 11 includes a central processing unit (CPU) 12, which may be provided, for example, as a conventional microprocessor, a random access memory (RAM) 14 for temporary storage of information, and a read only memory (ROM) 16 for permanent storage of information. Each of the aforementioned components are coupled to a bus 20. Operation of computer system 11 is generally controlled and coordinated by operating system software. The operating system controls allocation of system resources and performs tasks such as processing, scheduling, memory management, networking, and I/O services, among other things. Thus, an operating system resident in system memory and executed by CPU 12 coordinates the operation of the other elements of computer system 11.

Also coupled to bus 20 is a non-volatile mass storage device which may be provided as a diskette 22. Diskette 22 is insertable into a diskette drive 24 which is, in turn, coupled to bus 20 by a controller 26. Similarly, a compact disc (CD) ROM 28 is insertable into a CD ROM drive 30 which is, in turn, coupled to bus 20 by a controller 28. A hard disk 34 is typically provided as part of a fixed disk drive 36 which is coupled to bus 20 by a disk controller 38.

Data and software may be provided to and extracted from computer system 11 via removable storage media such as hard disk 34, diskette 22, and CD ROM 28. For example, data values generated using techniques to be described below in conjunction with FIGS. 3–5 may be stored on storage media similar to media 22, 28, 34. The data values may then be retrieved from the media 22, 28, 34 by CPU 12 and utilized by CPU 12 to recommend one of a plurality of items in response to a user's query.

Alternatively, computer software useful for performing computations related to ACF methods may be stored on storage media similar to media 22, 28, 34. Such computer software may be retrieved from media 22, 28, 34 for immediate execution by CPU 12 or by processors included in one or more peripherals such as communication adapter 50. CPU 12 may retrieve the computer software and subsequently store the software in RAM 14 or ROM 16 for later execution.

User input to computer system 11 may be provided by a number of devices. For example, a keyboard 40 and a mouse 42 are coupled to bus 20 by a controller 44.

Computer system 11 also includes a communications adaptor 50 which allows the system to be interconnected to a local area network (LAN) or a wide area network (WAN), schematically illustrated by bus 52 and network 54. Thus, data and computer program software can be transferred to and from computer system 11 via adapter 50, bus 20 and network 52.

Figure 3:
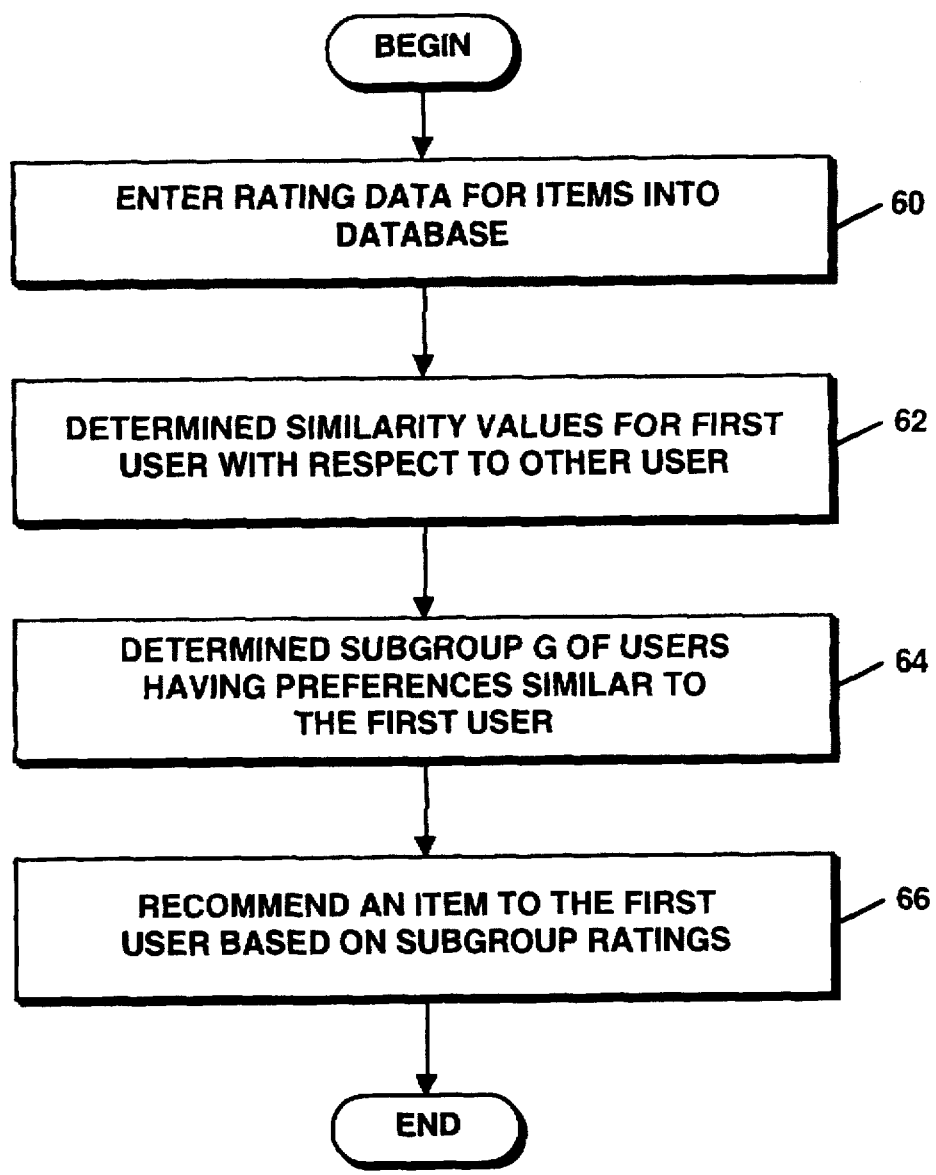
FIG. 3 is an exemplary flow diagram for the ACF system of FIG. 1.
Figure 4:
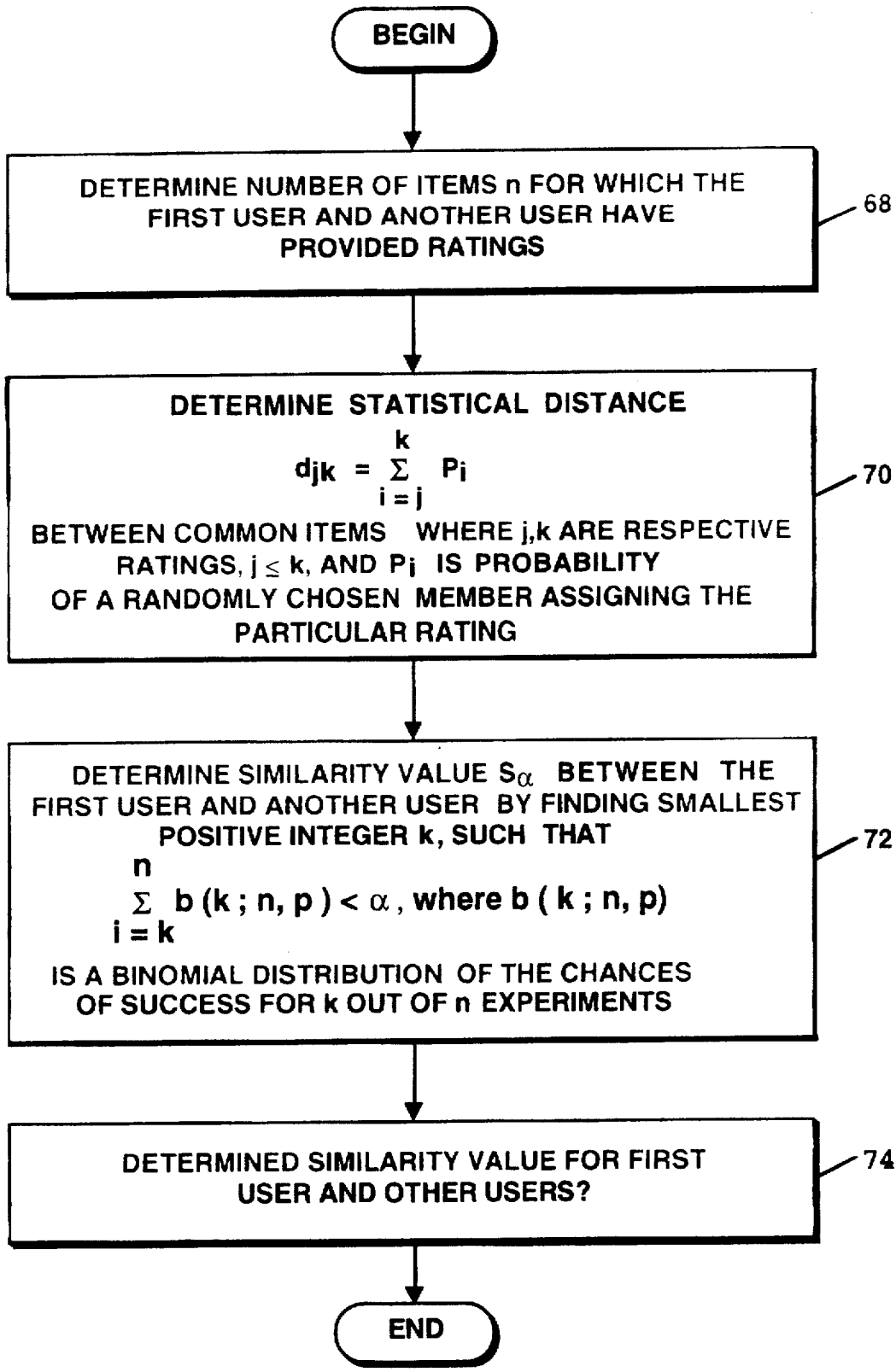
FIG. 4 is an exemplary flow diagram providing details of the flow diagram of FIG. 3.
Figure 5:
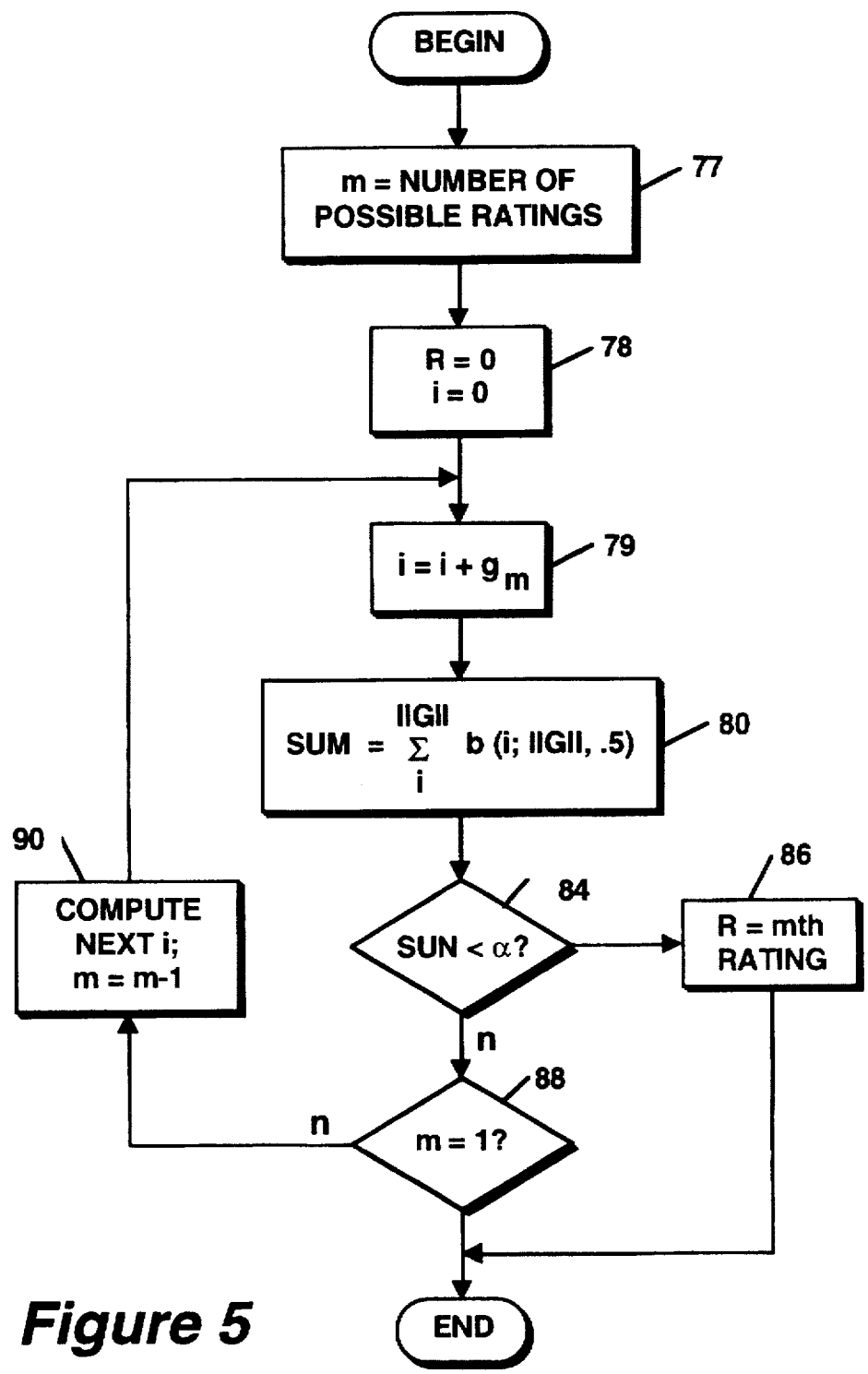
FIG. 5 is an exemplary flow diagram providing further details of the flow diagram of FIG. 3.

FIGS. 3–5 are a series of flow diagrams showing the processing performed by a processing apparatus which may, for example, be provided as part of ACF system 10 (FIG. 1) to provide user recommendations. The rectangular elements (typified by element 60 in FIG. 3), herein denoted "processing blocks," represent computer software instructions or groups of instructions. The diamond shaped elements (typified by element 92 in FIG. 5), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

FIG. 3 provides a high level description of the operation of the ACF system of the present invention. In step 60, rating data for users of the ACF system 10 is entered into the user information database 1. As can be appreciated by one skilled in the art, the data can be provided and entered in many ways, such as by keyboard, voice or other means. The ACF system 10 upon request of a first user determines a similarity value the first user as compared with other users in the database in step 62. In step 64, the similarity values are used to determine a subgroup of users having preferences similar to the first user. The ratings of the subgroup of users are then used to recommend an item to the first user in step 66.

FIG. 4 provides additional details for step 62 of FIG. 3 for determining similarity values for the first user and other users. In order to obtain a similarity value for the first user and another user, the first user and other user must have ratings in the database for at least one common item as in step 68. After the items that the first user and the other user have both provided ratings for have been identified, a statistical distance between the users, as defined below, is determined in step 70. The statistical distance is derived by taking into account the probability that a random user of the system, or general public, will provide a particular rating for the item. In step 72, the similarity value is determined by finding the smallest hypothesized S that can be rejected with a given confidence level. In an exemplary embodiment, a binomial distribution is used to calculate a probability to test against the confidence level. In step 74, if a similarity value for a predetermined portion of the other users in the system with respect to the first user have not been calculated, then the next user is selected to determine a respective similarity value.

The ACF system of FIGS. 3 and 4 is described in further detail below for an exemplary first user. As an illustrative example, the ACF system will generate a movie recommendation for a user referred to as Joe. The movies are rated according to a four star system in which users rank movies in one-half star increments from zero stars to four stars. Thus a movie which a user does not like may receive a rating of zero stars while a movie which a user does like may receive a rating of four stars.

Table I shows the distribution of exemplary ratings provided by an entire population in a database for a given movie.

TABLE I

| Stars | Probability $p_i$ |
|---|---|
| no stars | .03 |
| 1/2 star | .04 |
| * | .10 |
| *1/2 | .13 |
| ** | .15 |
| **1/2 | .17 |
| *** | .20 |
| ***1/2 | .12 |
| **** | .06 |

The Probability column shows the probability that a randomly-chosen member of the population would assign the associated star rating. The probabilities are approximated from a meaningful number of ratings for the movie, simply by calculating the proportion of the population that assigned each rating. Thus, if the population consists of one-hundred users, then a probability value of 0.2 indicates that twenty out of the one-hundred users assigned an item a particular rating. For example, Table I indicates that a rating of three stars received a probability of 0.20 indicating that 20 percent of a population assigned the movie three stars. The more ratings for a given movie, the more accurate the probabilities.

To continue in the exemplary illustration, suppose, for example, that Joe and Martha both assigned one star to the movie, whereas Henry and Ann both assigned the movie three stars. Referring to Table I, it can be seen that a randomly-chosen third user will share Joe and Martha's evaluation only 10% of the time, whereas a randomly chosen third user will share Henry and Ann's evaluation 20% of the time.

The ACF system determines which users are unusually similar in taste. Any information regarding which users are most likely to be unusually similar in taste is information that is valuable. In the above example we have more evidence for unusual similarity of taste in the case of Joe and Martha than in the case of Henry and Ann.

Prior art techniques which relied solely on the star ratings and ignored probability information, would simply conclude that two users who assigned an item, e.g. a movie, the same star rating had a similar taste. For example, Joe and Martha each assigned a rating of one star to the same movie. The difference between the ratings is zero thus indicating that Martha and Joe have similar taste. Like wise, for Henry and Ann the difference between their star ratings for the movie of this example is zero thus indicating that they have similar taste. In order to make maximal use of the data at hand more than the star ratings alone must be used. The present invention considers available probability information. The probability value $P_i$ in column two of Table I represents the probability that a randomly-chosen user will assign the corresponding rating to the movies. As used herein below the probability values are also referred to as the "size" of the rating. Thus referring to Table I a rating of three stars has a size of 0.20.

Now suppose that Joe and Martha assigned the same rating to the movie in question. This does not necessarily mean that they each had exactly the same degree of enjoyment of the movie. To the extent that all users mean the same thing by the ratings they assign, it is known that Joe and Martha both enjoyed the movie more than those people who assigned lower ratings, and less than those who assigned higher ratings. For instance, it's possible that Joe liked the movie less than anyone else who assigned this rating, and that Martha enjoyed it more than anyone else who assigned the rating. Then the statistical distance between Joe and Martha could be approximated by the size of the rating (the approximation grows more accurate as the number of people in the population increases).

In defining a distance measure between the ratings provided by the two users, a degree of closeness is assigned that is consistent with the knowledge at the time. Thus, if two users assign the same rating, their statistical distance will be the size of the rating. In general, for a particular movie, the statistical distance $d_{jk}$ between two users who assigned ratings j and k, for $j \leq k$, is given by:

$$d_{jk} = \sum_{i=j}^{k} p_i \qquad \text{Equation 1}$$

in which $_i$=probability of the $i^{th}$ rating.

When the system is first put into active use, it won't have any ratings. At this point, all ratings are assumed to be equally likely. The system models the probability of each rating being assigned across the entire population of movies, or group of items. Then that distribution can be used for those movies that, alone, do not yet have enough ratings to provide an accurate model. Alternatively, weighted averages of the various models can be used where the weights depend on the amount of data available.

If relatively few ratings for a given movie are known, the distribution can be modeled by taking the average of those ratings, and using the distribution derived from all movies in the database which also have that average rating. When all ratings are equally likely, calculations will be exactly the same as if everything were based on star ratings alone and ignoring the associated probabilities. As the system moves away from the simple model, it is able to more and more accurately incorporate the probability information.

Suppose there are three movies that Joe and Martha have each seen and provided ratings for. Further, suppose that they assigned the same ratings in each case, so that their statistical distances, in each case, are small. This provides evidence that Joe and Martha are similar in taste, but there is always the possibility that they would disagree on the next ten movies. In other words, the sample of three movies does not provide certainty that they have generally similar tastes; it merely gives a certain amount of evidence.

Now, suppose the distance could be measured between Joe and Martha for any movie they might have chosen to see if they had the opportunity and might see in the future—this population of movies includes even those movies that haven't been made yet. Call this movie population M. Then there exists some number S such that, if a movie is randomly chosen from M, it is as likely that the distance between the ratings will be greater than S as it is that it will be less than or equal to S. In formal terms, let $_{JOE, Martha}$ be a random variable denoting the distances between Joe and Martha with respect to randomly chosen movies in M. Let P( ) be the probability function. Then $$S = \{r \in (0,1) | P(D_{Joe,Martha} \leq r) = 0.5\} \qquad \text{Equation 2}$$

The nearer zero S is, the more similar in taste the two users may be said to be. So S would be an excellent measure of similarity, except for the fact that it cannot be computed due to the finite nature of the data in our database. Despite the fact that S can't be calculated, it can be considered to be the actual degree of similarity between the users.

The system can make intelligent guesses about S; and, the more movies Joe and Martha have in common, the more confidently we can make assertions about it.

Generally, the system estimates S and tests the estimate against the ratings data. For instance, suppose Joe and Martha have 5 movies in common, and the distances are 0.2, 15, 0.1, 0.1, 0.09, and 0.08. It appears that Joe and Martha have very similar tastes; it seems likely that S is less than 0.2. While it is not known that S<0.2 from the evidence at hand, it is a reasonable determination. The next question is how certain is it that S<0.2?

To determine how certain it is that S<0.2, the opposite proposition is tested. The possibility that S>0.2 is tested and evaluated. To conduct the test, it is noted that if the evidence says that the two users are so similar that it is very unlikely that S=.2, then it is even more unlikely that S is some number greater than 0.2. Thus, only the case that S=0.2 is tested.

The assumption that S=0.2 is referred to as a null hypothesis, denoted by $H_0$. The alternate hypothesis, $H_A$, says that S<0.2. If $H_0$ can confidently be rejected, then it must be the case that $H_A$ is true.

For instance, in the example, the assumption that S=0.2 implies that in all 5 cases, the distance was less than or equal to S. But the meaning of S is that the probability of this happening, in each case, is 0.5. Thus, the probability of all distances being less than 0.2 is 0.5*0.5*0.5*0.5*0.5= 0.03125. It follows that, if $H_0$ is true, then a very rare event occurred—one that would only be expected to happen with a probability of 0.03125.

It is a statistical procedure to choose some probability, usually denoted by $\alpha$, and to reject $H_0$ if the calculated probability is less than $\alpha$. ($\alpha$ is also frequently referred to as the confidence level.) For instance, if $\alpha$ was chosen to be 0.20, then the calculated probability of 0.03125 means that $H_0$ would be rejected and $H_A$ would be assumed to be true; in other words, it can now confidently be said that the data shows that S<0.2.

Now another guess about S can be made. Now it is known that it can confidently be said that S<0.2, perhaps it can also be confidently said that S<0.15. (0.15 is chosen because it's the next-largest distance associated with our 5 movies after 0.20.) It must be determined how confidently the new $H_0$ can be rejected, which says that S=0.15.

When the data is examined, it can be seen in one case that the distance is greater than S and that in the remaining four cases, it is less than or equal to S. Each of these cases can be regarded as an experiment. Each of the experiments is said to be successful if the distance is less than or equal to S.

The probability of getting k successes out of n experiments is given by the binomial distribution, defined as $$b(k;n,p) = \binom{n}{k} p^k q^{n-k}$$ Equation 3 where $$\binom{n}{k} = \frac{n!}{k!(n-k)!}$$

It is noted that like many standard statistical calculations, the applicability of the binomial distribution depends on the independence of each of the experiments. In our case, if two movies are very similar, then the distances are likely to be correlated; if Joe and Martha both like movie A, and movie B is very similar, it's likely that they'll both like movie B. However, if Joe and Martha didn't have similar tastes, it's very unlikely that they would have chosen to see two such similar movies out of the hundreds released each year. Their predilection for choosing similar movies is one of the factors contributing to their similarity S. When considering the action of choosing a particular movie, as well as the action of giving ratings, as both contributing to the experimental result of a particular measured distance, the distances are independent. In other words, at the beginning of the experiment, it is not known what movie will be chosen; the aforementioned correlation only exists if we have already know the movie. The invention is not to be limited to a binomial distribution, as other distributions can also be used.

The binomial distribution gives the chances of 4 successes out of 5 experiments, where each experiment has a probability 0.5 of success, to be b(4;5,0.5)=0.15625. This result is a small number, even compared to the confidence level of 0.20. However, any specific number of successes is relatively unlikely. One success is unlikely, two is unlikely, etc. Even the most likely specific number of successes in 5 experiments, which is 3, only has a probability of 0.3125 which is still considerably less than an even chance. Thus, not only is the probability of the specific case given by the data determined, but also the probability of the occurrence of this case or one even more inconsistent with the null hypothesis.

In the example, the only case even more inconsistent with the null hypothesis is the case of 5 successes, which we already computed to have a probability of 0.03125. The total probability of the two cases is thus 0.15625+0.03125= 0.1875. Thus, at confidence level $\alpha=0.2$, we can still reject the null hypothesis.

The assertion that S=0.1 is then tested, which is the next largest distance. In this case, there are only 3 successes. As noted above, the binomial probability for 3 successes out of 5 experiments is 0.3125. The total probability of 3, 4, or 5 successes is therefore 0.3125+0.15625+0.03125=0.5, which is considerably greater than the confidence level of 0.20, meaning that in this case, the null hypothesis can not be rejected. Thus $S\alpha$ is defined as the smallest hypothesized S which can be rejected with confidence level $\alpha$. If there is no hypothesized S that can be rejected with confidence level $\alpha$, then $S\alpha$ is 1.

It is noted that assumed S's greater than 0.2 would lead to the same probability calculations as the assumption that S=0.2; the assumption of S's between 0.2 and 0.15 would lead to the same probabilities as the assumption of S=0.15; etc. So there is no need to test possible S's other than those that correspond to the actual distances that appear in the data for Joe and Martha. In the example, $S\alpha$, is therefore 0.15.

As a practical matter, it is not necessary to actually test hypothesized S's. Suppose there are n movies seen by both Joe and Martha. Then there exists some positive integer, k, which is the smallest k such that $$\sum_{i=K}^{n} b(k;n,p)$$

is less than $\alpha$. The integer k can be stored in a table in RAM, or other memory device, indexed by n. Thus, the process of finding $S\alpha$ consists of two steps: doing a table lookup to find k, and then retrieving the kth distance from the list of n distances between ratings for movies seen by both Joe and Martha. The table can be ordered from largest to smallest.

Actual S, if it could be calculated, would be a perfect measure of similarity between two users. It can't be, so a calculated $S\alpha$ is used. $S\alpha$ has a strange characteristic for an estimator of S. $S\alpha$ is defined to be the least hypothesized S that can be confidently rejected. It would seem counterintuitive to use a value rejected as an estimator. However, $S\alpha$ can also be seen in a very different light.

Since the assumption that $S>S\alpha$ is rejected, it may appear that an estimator less than $S\alpha$ should be used. But what number less than $S\alpha$ should be chosen? $S$ is not assumed to be closer to zero than the evidence supports. The desire to be conservative implies that there is no justification for choosing any particular number less than $S\alpha$, since there would always be real numbers between the chosen number and $S\alpha$, and those real numbers would be more conservative choices. There is no evidence to support any particular choice less than $S\alpha$.

In one sense, the maximum value of the interval $(0, S\alpha)$ is desirable. (The ( ) notation represents an "open" interval—one that does not contain the end points.) However, since there is no maximum value on an open interval, the upper limit of the interval is taken. But this upper limit is $S\alpha$ itself.

So $S\alpha$ can be looked at "positively" as well as "negatively." It is not only the smallest hypothesized $S$ which is rejected with confidence level $\alpha$, it is also the upper limit of the hypothesized $S$ that is acceptable. It is the boundary between the regions of acceptance and rejection.

There are some other aspects of $S\alpha$ that deserve discussion. There are three categories of information available for use in ACF systems:

1) The general tendency toward agreement between the two users, as manifested in their ratings. This is reflected in $S\alpha$; lower values for the distances tend to lead to more significant (closer to 0) values for $S\alpha$.
2) The number of items rated by the two users. This is n in the calculations for the binomial distribution. Greater n's tend to result in $S\alpha$'s closer to 0 when the ratio of ratings above and below each proposed $S$ stays the same. For instance, in the example above, one distance was above $S\alpha$ and four below it; when the summed probability of that case and the case even more inconsistent with the null hypothesis, the associated probability was 0.1875, which allowed rejection of the proposed $S$. But suppose that there were two distances above $S\alpha$ and eight below it; then, using the same procedure, results in a probability of 0.0547. Thus, by increasing n while keeping the ratio the same, the proposed $S$ is rejected with a much greater degree of certainty. Using a confidence level of $\alpha=0.15$, the assumption that $S=0.15$ is rejected in the latter case but not in the former. This demonstrates the manner in which greater n's tend to lead to $S\alpha$'s near 0.
3) The overall distribution of ratings, considering the population as a whole, for the two users. Suppose Joe and Martha have both seen and rated 5 movies, as in the example; but these movies are all movies that Joe, Martha, and most other people love. It may be that 30% of the population assigned 4 stars for the first movie, 25% for the second, etc., and in each case, both Joe and Martha assigned 4 stars. Assume the specific distances are 0.3, 0.25, 0.22, 0.21, and 0.20. The procedure used earlier to find $S\alpha$ would result in $S\alpha=0.25$, rather than the 0.15 found before where more typical movies were involved. This demonstrates the manner in which the distribution data is processed. Since there is less evidence for unusual similarity of tastes in cases where Joe and Martha simply agree with most other people than in cases where they agree with each other but disagree with most others, it is fitting that the latter case tends to result in more significant values for $S\alpha$.

One interesting aspect of $S\alpha$ is that different choices for $\alpha$ will result in different calculated values for $S\alpha$. How is the value to use for $\alpha$ selected? This question exists in other applications of statistics, as well. In most cases, a is simply chosen according to how certain the researchers want to be that their conclusions are correct. There is a tradeoff involved: if a confidence level of 0.01 is chosen, the researchers can be very certain that their conclusions are correct; but the resulting conclusions will usually tend to be weaker. So a confidence level of level of 0.05 or 0.1 is usually chosen.

For example, suppose $\alpha=0.01$ in the original example. Then the resulting $S\alpha$ would have been 1, since 5 movies wouldn't have provided enough information to "confidently" reject any particular assumed distance. A confidence level of 0.1 would have given $S\alpha=0.2$; and, a confidence level of 0.2 leads to $S\alpha=0.15$.

There is a way of choosing the best $\alpha$ for the invention: it is simply the one that, when all has been said and done, enables the invention to make the most accurate recommendations. This can be easily tested for a range of possible values for $\alpha$; the test procedure will be discussed later on. It is to be expected that this optimal value of $\alpha$ will change during the lifetime of a particular system; for instance, when a system is just starting up and has few users, it may be that $\alpha=0.4$ gives the best results; when there are many thousands of users, $\alpha=0.10$ may be best because there will be so many more users to chose closest matches from so that the system can afford to require a higher degree of certainty.

As can be seen, as the number of movies seen by both Joe and Martha increases, the amount of available evidence for a particular degree of similarity increases. If Joe and Martha have 3 movies in common and agreed on all of them, that gives a certain amount of evidence that they have similar tastes. On the other hand, if they have seen 20 movies in common and agree on all of them, that gives far more evidence. In the latter case, the system can be very confident that the two users have very similar tastes; in the first case, their agreement on 3 movies has a much greater possibility of being due to chance alone; it may well be that they would disagree strongly on a fourth movie. Thus, the system uses n meaningfully. As n increases, $S\alpha$ decreases as long as the general distribution of individual ratings remains the same. The calculations by which confidence levels are generated are statistically meaningful. Consider the following example:

Suppose Joe and Martha have 5 movies that they've both seen, and that they closely agree on every one of them. In addition, assume that George and Mary have a very large number of movies that they've both seen, but, on average, only show a slight agreement on each one. The system puts a bound on $S\alpha$. This bound, which is approached asymptotically from above as n increases, is $S$. As discussed earlier, $S$ connotes the actual degree of similarity between the users, and is not possible to calculate directly. Despite the fact that it can't be calculated, it does exist for every pair of users. Thus, the computed similarity value behaves as expected and preferred in order to choose people to give meaningful recommendations.

The overall distribution of ratings is another important source of information. Suppose Joe and Martha have seen 5 movies in common, all of which are extremely popular movies that almost everyone loves. Suppose further that Joe and Martha agree with each other (and most other people) on each of those movies. Now consider George and Mary, who have 5 movies in common that appeal to quirky, unusual tastes. They agree with each other on each of those movies, but few other people agree with the two of them. It is obvious that the second case provides more evidence that the two users have unusually similar tastes than does the first case. And users with unusually similar tastes are the ones who should be providing recommendations for each other. The present invention takes this information into account.

After computing similarity values for Joe with respect to other users in the database, a subgroup G is chosen which is used to make recommendations to Joe. In one embodiment, G is chosen based on a percentage of the total number of users, two percent for example. In other embodiments, different percentages are used, and minimum and maximum numbers of other users can be required. Further, G can be chosen by other techniques besides a percentage, and the invention is not to be limited thereto.

Once the group G of users who are close to Joe in taste is chosen, the task of using G to make recommendations remains. The goal is to assign ratings to movies in such a way that to be very confident that Joe will actually enjoy the most highly-rated movies. Thus, two factors are taken into account.

The first is the general tendency of members of G toward rating the movie either positively or negatively. Obviously, if the tendency is to rate the movie very highly, that is a movie the system should consider recommending.

The second factor is the confidence level. If for instance, only two members of G have seen the movie, then, even if both of them assigned the highest possible rating, it may be that there is still not enough reason to be confident that Joe will also love it.

In order to simultaneously handle both of those factors, a technique similar to that used for computing $S\alpha$ is used to compute a measure of appropriateness for recommendation value, $R\alpha$. The calculations are based on a confidence level, $\alpha$, although a different value for $\alpha$ can be chosen when computing $R\alpha$ than for computing $S\alpha$.

FIG. 5 provides more detail for step 66 of FIG. 1, recommending an item to the first user based on subgroup ratings. In step 77 m is set to the number of possible ratings for an item and in step 78 recommendation value R and index i are initialized to zero. In step 79, i is set to the value of $g_m$, where $g_m$ initially is the number of users in the group G that has provided the highest rating in the group. A sum of the probabilities associated with the highest rating is computed in step 80. The sum is then compared against confidence level $\alpha$ in step 84. If the sum is less than the confidence level, then a recommendation level is set to the mth rating in step 86, which is the highest rating in the first cycle. If the sum is greater than or equal to the confidence level, and (m–1) tests have not been completed as tested in step 88, then the next i value is computed and m is decremented in step 90. The index i is computed so that for each cycle, the number of users in group G giving the next highest rating is included. In other words, for each cycle the next highest rating is included in determining the probability in step 80. In step 80, the next probability sum is computed for the highest rating and the next highest rating together and so on until (m–1) tests have been completed or the sum is less than the confidence level. In step 84, when the sum has been determined to be less than or equal to the confidence level, in step 86, the recommendation level is set to the lowest rating for the item that has been included in the computed sum of step 82.

Determining a recommendation level or value as shown in FIG. 5 is further described below in the continuing example.

As stated above, G is the group of people in the database who are very similar to Joe in taste. G can be a sample from a much larger population: the population of people in the universe, the vast majority of whom are not in the database, who are very similar to Joe in taste. G might be generated to contain the closest 2% of the people in the database, or another percentage could be used (when the number of people in the database is very small, it will be preferable to use a larger percentage for G, say, 30%).

An inference about this population can be made. If it is certain that most of those who are very near to Joe in taste would rate the movie at least 3½ stars, for instance, then the system can reasonably assume that Joe will, as well: after all, he is just one more member of the population of people very near Joe in taste. Let's call this broad population of people who are very similar to Joe G. Suppose some rating R is chosen and we assume that it is as likely his rating for the movie in question will be below R as it is that his rating will be equal to or above it. This assumption will be the null hypothesis. (These R's are not necessarily numeric; most ratings systems will consist of numbers—the common movie rating system is an example of this—but others may be verbal; they do, of course, have to be orderable.)

$R\alpha$ can now be defined. $R\alpha$ is the greatest hypothesized R which can be rejected with confidence level $\alpha$. If there is no hypothesized R that can be rejected with confidence level $\alpha$, then $R\alpha$ is 0.

Say there are m possible ratings (for the movie example, m=9, since there are 9 possible ratings in the sequence 0, ½, 1, . . . ,4). Let $g_0$ be the number of members of G who assigned the lowest possible rating, $g_1$ the number of members of G who assigned the next lowest rating, etc. Let $\|G\|$ be the total number of members of G.

The steps are as follows. Compute $$\sum_{i=g_m}^{\|G\|} b(i;\|G\|,.5).$$

If the result is less than or equal to $\alpha$, then $R\alpha$ is the mth (greatest possible) rating. If not, compute $$\sum_{i=g_m+g_{m-1}}^{\|G\|} b(i;\|G\|,.5).$$

If the result is less than or equal to $\alpha$, then $R\alpha$ is the (m–1)th rating. Continue in this manner until there is a sum less than or equal to a or have done m–1 tests. Practically speaking, the system can stop before doing m–1 tests. If $R\alpha$ is the greatest possible rating, then it be very confident that Joe will enjoy the movie. If the second greatest possible rating, it can be slightly less sure, etc. If $R\alpha$ is the middle rating or below, the system may not even consider recommending it; why not restrict recommendations to the movies with confidence Joe will like very much? So, after a certain, point, the system can stop testing. Of course, the system need not calculate cumulative binomial distributions over and over again. They can be stored in lookup tables in RAM.

$R\alpha$ is a recommendation level, or value. While, in a sense, it could also be thought of as an estimate of the rating Joe will give when he sees the movie in question, it is not the best possible such estimator. The reason for this is that $R\alpha$ is very demanding of a high degree of confidence. $R\alpha$ will only correspond to one of the top ratings if there is a great deal of evidence (depending, of course, on the chosen $\alpha$) that members of G' tend to rate the movie highly. For instance, say $\alpha=15$, and say G contains 9 ratings from users who have seen movie A: 0, 1.5, 2, 3, 4, 4, 4, 4, 4. Since $$\sum_{i=5}^{9} b(i,9,.5) = .498$$

is greater than 0.15, Rα isn't 4. Since $$\sum_{i=6}^{9} b(i,9,.5) = .254,$$

Rα isnt't 3. But $$\sum_{i=7}^{9} b(i,9,.5) = .09;$$

therefore Rα is 2 (2 is the star rating associated with the seventh greatest user-supplied rating for users in G).

It is clear that 2 isn't the best estimate for Joe's star rating. After all, the average rating is 2.94, which is far closer to 3 stars. But Rα is nevertheless quite meaningful for making recommendations. The movie in the example above is probably a movie that Joe would like; but there isn't enough data to be confident of that. So, if confidence that Joe would enjoy the movies recommended by the system is desired, the system wouldn't recommend that movie.

Let's look at another example, movie B. In this example, there is the exact same distribution of ratings, but twice as many of each one: 0, 0, 1.5, 1.5, 2, 2, 3, 3, 4, 4, 4, 4, 4, 4, 4, 4, 4, 4. Since there are 10 4-star ratings, start be calculating $$\sum_{i=10}^{18} b(i,18,.5),$$

which is 0.407; so Rα isn't 4. But $$\sum_{i=12}^{18} b(i,18,.5) = .119,$$

which is less than α; thus we have Rα=3.

Note again that the distribution of ratings is the same for movie B as for movie A; the only difference is that there's more evidence (in the form of more collected ratings) in the second case. So even though both cases have the same average rating, the confidence level or value is higher that Joe would enjoy movie B than movie A; so it's appropriate that Rα is greater in the case of movie B. It's also important to note that more evidence (ratings) doesn't cause Rα to rise indefinitely; its upper limit is the least rating, supplied by a member of G, that is equal to or above the median of the ratings in G.

It may be desirable that users of the system never see the Rα that is associated with a given movie. It would be misleading with respect to the actual expected goodness of the movie—as in the case mentioned above where a movie with an average rating (in G) of 2.94 was assigned Rα=2. Instead, Rα is ideally used solely in determining the order of suggestions. The movie with the highest Rα will be the most highly-recommended movie the movie with the next highest Rα will be the next most highly-recommended movie; etc. Often, these recommendations will take the form of a list with the most highly-recommended movies appearing at the top.

It is quite possible to build a functioning ACF system without displaying specific projections about what rating Joe is most likely to give. Indeed, displaying such projected ratings may be confusing, because levels of confidence (manifested in the preferred embodiment in the form of Rα) may lead to a movie with a lower "most likely rating" than another movie to be more highly recommended than that other movie. However, in a particular ACF system, it may nevertheless be desired that projected ratings be displayed.

One way of generating a projected rating is to compute a weighted average of the ratings supplied by the members of G. Or a projected rating based on the median of the ratings supplied by members of G can be more appropriate. Everyone who views a particular movie has a certain level of enjoyment of that movie. These levels are captured by the ratings, but in fact the possible levels of enjoyment are infinite and there are only a fixed number of ratings. So users who assign the same rating don't actually feel exactly the same way about the movie. A system involving real numbers on the unit interval would be far more able to capture the reality than a discrete, 4-star ratings system is.

Suppose that the actual, real-valued level of enjoyment of the movie in question for the members of G could be captured. Then those users can be ordered from lowest enjoyment to highest. Since G is a group of people who are clustered around Joe, his most likely level of enjoyment would be close to that of the middle member of the group—in other words, the median.

Suppose, as in the earlier example, that we have collected 9 ratings from members of G 5 of which are 4 stars. The median real-valued rating would be the fifth from the top, which would be in the top ninth. So it would correspond to 4 stars, even though 4 other users ranked the movie below 4 stars. Thus, 4 stars would be the projected rating.

But the system does not need these real-valued ratings. Using the median of the discrete ratings from a usual rating system gives the same effect. It may be argued that this technique has the drawback of ignoring the magnitudes of the ratings, and that using that information involves computing an average rather than a median. For instance, the average rating in the example is 2.94, since it takes into account the fact that two of the ratings are quite low. This is very different from the projected rating of 4 which results from the median-based method.

However, it can be argued that it is really the average-based method that is "ignoring" the actual levels of enjoyment. According to the average method, everyone assigning 4 stars felt exactly the same way. 4 stars usually has the meaning, "excellent." The fact is, that there are many different levels of enjoyment that fall within the word "excellent," ranging from "slightly better than very good" to "a truly wonderful, utterly life-changing experience." If the system bases computations on the star-ratings themselves, as when taking an average, the true situation is distorted by pretending that such different levels of enjoyment don't exist. One way to avoid this distortion is to rely on the median rather than the average.

The members of G are ordered in increasing value of the ratings they supplied for the movie in question. Further, suppose a computed weight for each member of G, where those weights depend on that user's distance from Joe. Let $w_i$ be the weight associated with the ith movie in this ordering. Let j be the nearest integer to $\Sigma i w_i / \|G\|$; then j is our "weighted median", and the rating associated with the jth member of G (again using the ordering defined above) is the projected rating. Optimal weights $w_i$, for each distance can be determined by means of genetic algorithms discussed below.

It may be desired, in a particular implementation of the invention, to make recommendations in an order determined by the projected ratings ($R_p$) rather than in an order determined by Rα. In fact, if the system does display $R_p$, it could be confusing to order them in any other manner. If $\|G\|$ is even, then $R_p$ may not be between two valid ratings rather than a valid rating itself; in that case, it would still order the movies by $R_p$, but it might display the first valid rating above the invalid rating. Another reason to order the movies by $R_p$ is to make more interesting, but more risky, recommendations than would be made using Rα.

If the system is ordering the ratings by $R_p$, there are other ways to integrate the information represented by Rα. One way would be to annotate the list of recommendations such that the words "high confidence" appear next to each movie where $R_p$=Rα. Other, similar techniques can be easily envisioned.

One modification is to compute both the "weighted median" and the weighted average of the ratings supplied by members of G, and then calculating a weighted average of those two ratings. It is possible that in some or most real-world situations, this would produce the most reliable projected ratings. (As in the other cases, the weights for this final step could be determined empirically.)

Parameters can be tested to improve the system. There are three numbers which have to be chosen; two these are the α's related to Sα and Rα, $\alpha_S$, and $\alpha_R$. The other is the size of G. In order to optimize these parameters the system tests the goodness of each set of choices. This is done by randomly choosing one movie from each user, and pretending that the user hasn't seen it yet. Then Rα is generated for that movie. So, the system calculates one recommendation level for each user in the database; it will be associated with a randomly-chosen movie.

One goal is to make sure that the most highly-recommended movies are reliably going to be movies that the user will enjoy. A numeric measure is desirable that tells how well this goal has been met by a particular set of parameters. A good measure is to compute weighted average of the actual ratings for the selected movies, using Rα as the weights. Call this number $R_{WA}$. Let the actual rating for the chosen movie for user i be $r_i$, and let the associated Rα be Rαi. Then $$R_{WA} = \frac{\sum_{i=1}^{n} R_{\alpha i} r_i}{n} \quad \text{Equation 4}$$

Different values for $\alpha_S$, $\alpha_R$, and the size of G could be tested, using the actual data collected from users, and the combination giving the greatest value for $R_{WA}$ would be the one used. It is quite possible that, as a system is in use for a period of time, the best values for $\alpha_S$, $\alpha_R$, and the size of G will change as the size of the database grows.

The system could choose to only test values for $\alpha_S$ and $\alpha_R$ that are multiples of 0.1; this would mean there would be few values to test, and a solution could be found relatively quickly. Alternatively, finer gradations of $\alpha_S$ and $\alpha_R$ could be found by means of such optimization strategies as simulated annealing and genetic algorithms, but such searches would be likely to be more CPU-intensive.

Another possibility would be to not search for the best values for $\alpha_S$, $\alpha_R$, and the size of G at all, but to instead simply use "reasonable" values. For instance, up to a population of 10 users, $\alpha_S$ and $\alpha_R$ could each be 0.4; up to 100 users, $\alpha_S$ and $\alpha_R$ could each be 0.3; up to 1000, 0.2; up to 10,000, 0.15; and above 10,000, 0.1. (The idea is that when there is less data, it is much more difficult to achieve high confidence levels; by choosing relatively high numbers for $\alpha_S$ and $\alpha_R$, the system takes that fact into account.) Similarly, the size of G could be 30% of the database up to 100 users, 20% up to 1000 users, and 10% after that.

The invention is described in the context of recommending movies. Of course, nearly any subject matter where individual tastes are involved is a possible target for the present invention. Recommendations can be made in the fields of music, books, restaurants and other areas. The fact that the invention focuses on movies should in no way be construed to limit the scope of the invention to movies.

Of course, many rating systems could be used; the 4-star system frequently referred to herein is merely an example. Some considerations: the more possible ratings there are, the more information the algorithm has to work with. In this sense, a 10-star rating system would be better than a 4-star system. On the other hand, the more possible ratings there are, the more confusing the system is for the user. It becomes very difficult to give distinct meanings to the different possible ratings that will mean the same thing to all users.

Thus, Rα and $R_p$ and Sα are computed. Sα is an appropriate measure for finding people who are similar in taste for purposes of predicting each individual's future likes and dislikes, since it meaningfully incorporates a great deal of the relevant information into one number. This information includes:

1) The distribution of ratings across all users in our database for the movies seen by both Joe and Martha.
2) The ratings supplied by Joe and Martha for each movie they've both seen.
3) The number of movies they've both seen.

Similarly, Rα and $R_p$ are meaningful values for the recommendation level, and projected rating, respectively.

Genetic algorithms (GA) can be used to generate weights. GAs are based on evolutionary theory which allows a maximal solution to a problem to be achieved by finding the best values for the relevant parameters. GAs are in common use today in solving a practical problems. GA's require a "fitness function" to exist which can provide the "goodness" of a particular set of parameters. The goodness is the average of the absolute values of the differences.

Modeled after biology, a set of parameters is called a chromosome and is encoded as a string of bits. We start with a population of, say, 100 chromosomes. Each chromosome is tested using the fitness function. Two of the best-performing chromosomes are then chosen to be "parents"; the information in each of them is combined into an offspring, which is then put into the population. Poorly performing chromosomes are pulled out of the population, so that the population size remains constant. Mutation can occur during reproduction. Over time, the chromosomes in the population become better and better; evolution is taking place.

As well as finding optimal values for $\alpha_S$, $\alpha_R$, and the size of G, GA's could be used to create a RAM-based table which could translate various values of Rα into weights to be used in generating recommendations. To do so, a method for encoding such a table into a bit string is required. Suppose we would like a table with 50 entries. For instance, the first element of the table might represent so that Rα values in the interval (0.0, 0.01], the second (0.01, 0.02], etc. up to (0.49, 0.50]. The table entries would be the weights. One approach would be to simply encode the table as 50 floating point numbers. But this would be an extremely inefficient encoding scheme, requiring thousands of bits. The more bits there are, the more difficult a problem is for the GA to optimize. Thousands of bits is out of the range of reasonable possibility. Also, such an encoding would ignore the fact that we can confidently expect that the best table will have weights that decrease as Rα increases. By using this knowledge in the encoding scheme, we can greatly increase the efficiency of the evolutionary process.

In an exemplary embodiment, 49 bits are allocated. We assume that the first weight, corresponding to the interval (0.01, 0.01], will be 0.1, and the last weight, corresponding to the interval (0.49, 0.50] will be 0. The 49 intervening bits represent the other 48 array entries. Any bit can be either 1 or 0. If the k th bit is 1, then the k th array entry will be the same as the (k −1)th. If the k th bit is 0, then the k th array entry will be one step lower than the (k−1)th. The size of the steps will be determined by the total number of bits that are set to 1. If the number of bits set to 1 is m, then the step size will be 1/m. There can be any number of steps (up to, of course, 49). This encoding will give a way to efficiently use GA's to evolve a table of weights.

The algorithms for computing $S\alpha$, $R\alpha$, and $R_p$ should not be construed as limiting the scope of the invention to that described. One skilled in the art will realize other embodiments within the scope of the invention. For instance, based on a probability of 0.5; the definition of S says that it's as likely that the distance associated with a randomly chosen movie will be above S as equal to or below it. Another ratio could be used instead; for instance one could say the probability is 0.4 of being above S and 0.6 of being below or equal to S. In fact, one probability could be used in generating S and another in generating R. Also, other distributions than the binomial could be used; for instance, the normal approximation to the binomial.

One aspect of the invention is that the category of information represented by the number of movies seen by the two users can be properly handled by choosing a level of confidence, and then finding a degree of closeness which the system can be certain of up to that level of confidence. In the preferred embodiment, the level of confidence is given by $\alpha$ and the degree of closeness if given by S and R. But other degrees of closeness could be used as well. Indeed, any methodology that uses a statistical argument to determine a degree of closeness between two users that is associated with a fixed confidence level comes under the scope of this invention.

Another aspect of the invention is computing the proportion of users who provided each rating for a given movie. This allows us to estimate the overall distribution; an estimate of this distribution is very useful in calculating meaningful estimates of distances between users.

Let $q_i$ be the estimated probability of a randomly chosen member of the population assigning the ith rating for the movie in question, as estimated by calculating the proportions of users who actually assigned each rating. Then let $$r_{Tj} = \begin{cases} \frac{q_1}{2} & \text{for } j = 1 \\ \sum_{j-1}^{i=1} q_i + \frac{q_j}{2}, & \text{for } j > 1 \end{cases}$$

Equation 5 be the transformed rating.

In the example, the j's range from 1 to 9:

TABLE II

| Star rating | Percentage of Population | Transformed Rating ($r_{Tj}$) |
|---|---|---|
| no stars | 3 | .015 |
| 1/2 star | 4 | .05 |
| * | 10 | .12 |
| *1/2 | 13 | .235 |
| ** | 15 | .375 |
| **1/2 | 17 | .535 |
| *** | 20 | .67 |
| ***1/2 | 12 | .88 |
| **** | 6 | .97 |

$r_{Tj}$ is continuously-valued, so differences in $r_{Tj}$'s will also be continuous.

$r_{Tj}$, as defined above, is not the only way to transform ratings so that they incorporate information about the overall distribution. The definition involves a $q_i/2$ term in each case; alternative transformed ratings could set that term always to 0 or $q_i$; or even a random number between 0 and $q_i$. Any number of other modifications are also possible.

There are many other possible ways to incorporate this type of data. But the process is to compute the distribution of ratings, and then use that distribution in further calculations; any methodology that combines these two steps falls under the scope of the present invention.

Different applications of the ACF technology described involve different types of input and output devices. When used with a recommendation service on the World Wide Web, for instance, input will usually be through a computer keyboard and output will be through a video display screen or liquid crystal screen. Kiosks could also be used, where the input would be by means of a computer touch screen. Such kiosks could communicate with a central database through the Internet; indeed, their interfaces could be written, for instance, in HTML or Java. In another embodiment, the invention is available through televisions. A very convenient input device for ratings in a home television viewing context would be a set of buttons, a slider, or some other input means integrated into a television remote control. This would enable a viewer to enter a rating for a movie or TV show without leaving his seat and while the experience is still fresh in his mind. In most cases, such ratings will be uploaded to a central database for regular ACF processing, although they might be stored locally temporarily.

As a means for more efficient processing, cluster analysis can be used. Standard cluster-analysis techniques such as the K-means algorithm can group users together so that a large database could be reduced to a small number of clusters— say, 100 or 1000. The task then essentially becomes to determine which cluster (or clusters) Joe is closest to. This could involve far fewer comparisons then is the case when dealing with the population as a whole. This presents a specific measure to be used as a distance: $S\alpha$. This measure could be used as the distance between clusters. Euclidean distances or other distance measures could be used instead. After determining which cluster(s) Joe is closest to, we could simply say that his projected rating for a movie is the average weighing for people in those cluster(s). If it is chosen to use more than one cluster, a weighted average could be computed where the weights depend on the clusters. Any number of methods exist for computing the weights.

A projected rating could be computed based on $R_p$, or a recommendation level based on $R\alpha$. To do this, we would look at the individual ratings of all the people in the chosen cluster(s). These people would comprise G as described above.

Figure 6:
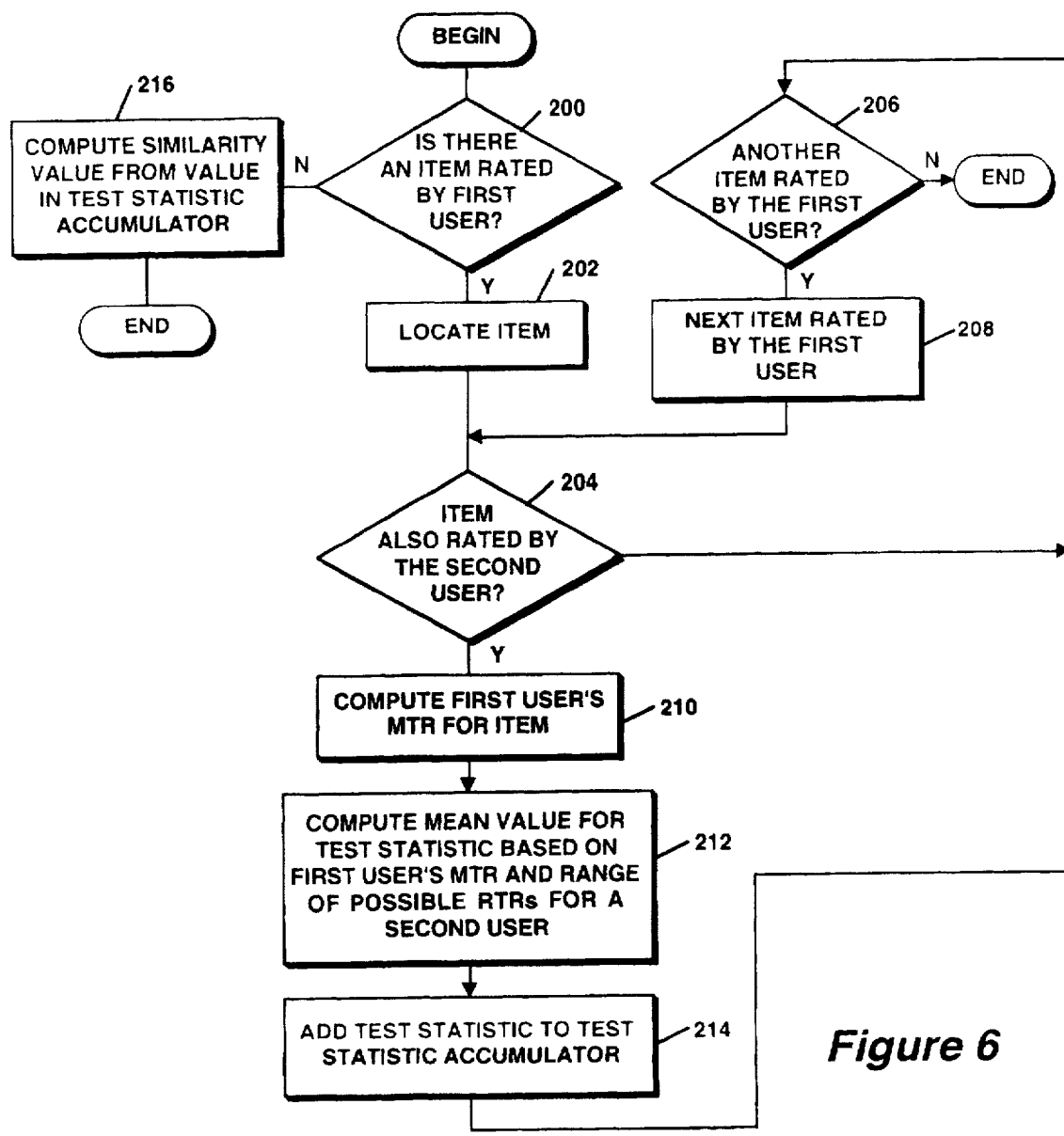
FIG. 6 is an exemplary flow diagram of another embodiment of the ACF system of FIG. 1.

FIGS. 6 is a high level flow diagram showing the processing steps in a further embodiment of an ACF system in accordance with the present invention. More particularly, FIG. 6 shows processing steps associated with an alternative technique for determining a similarity value as shown in step 62 of FIG. 3.

In step 200, the user database is searched to determine if the first user has provided any ratings for an item in the database. If the first user has not yet provided any ratings then a similarity value for the first user can not be determined sine there is no basis to compare the first user with any other user in the database. Once an item that the first user has provided ratings for is located in step 202, the system determines if a second user has also rated this particular item in step 204. If the second user has not rated the item, then in steps 206,208 another item is located that the first user has provided ratings for. Alternatively, if the second user did not provide ratings for the particular item, the system could attempt to locate another user that has rated the item, instead of locating another item.

If the second user has rated the item, in step 210 a median transformed rating (MTR) is computed for the current item.

Then in step 212, a test statistic is computed based on the first user's MTR and a range of possible randomized transformed ratings (RTR) for the second user. The current value for the test statistic is then added to the value in test statistic accumulator in step 214. Processing then flows back to step 206 where it is determined if the first user has provided ratings for another item. If not, then in step 216, the similarity value is computed from the value in the test statistic accumulator. Thus, there is a test statistic for each common item with respect to the first user and the second user. The similarity value for the first user with respect to a given second user is determined from the test statistics for the common items.

The ACF system of FIG. 6 is described in further detail below for an exemplary first user Joe. As in the previous example, the system will determine a subgroup of similar users and provide a recommendation to Joe based on the ratings provided by the users in the subgroup.

To calculate how similar Joe's taste in selecting items is to some other user, the system considers those items for which Joe and the other user have both provided ratings. Joe must have at least one item in common with the other user. If Joe and the other user rate most movies similarly, then the two users can be judged to have high resemblance as indicated by the computed similarity value.

For simplicity, assume that Joe and another user (say, Martha) have just one movie in common. That is, while the database has a number of ratings stored for each of these users, there is only one movie they have both seen and rated. For this example, Joe is the first user for whom the ACF system of the present invention finds other users with similar preferences. Second user Martha is a candidate for similar preferences. In this example as before, the item to be recommended is a movie, but the invention is not limited thereto. In an illustrative rating system, the movies are assigned ratings between 0 and 4 stars in increments of ½ star—a total of nine possible ratings, a discrete rating system. The ratings provided by the entire population in the database for the movie in question are distributed as shown in Table III.

TABLE III

| Ratings (star system) % | Percentage of Population |
|---|---|
| no stars | 3 |
| 1/2 star | 4 |
| * | 10 |
| *1/2 | 13 |
| ** | 15 |
| **1/2 | 17 |
| *** | 20 |
| ***1/2 | 12 |
| **** | 6 |

The percentage of population represents the probability that a randomly selected user would assign a particular rating to the movie as approximated by the percentage of the population that actually assigned that rating. The $j^{th}$ transformed rating may be denoted $r_{Tj}$. Thus, taking values from Table II, index i=1 corresponds to a rating of no stars and $r_i$=3% or 0.03. The transform rating for the $j_{th}$ index may be represented as $r_{Tj}$. The transformed rating $r_{Tj}$ is computed as:

$$r_{Tj} = \sum_{i=1}^{j} q_i \qquad \text{Equation 6}$$

in which
j=a selected rating; and $r_{Tj}$=a transformed rating for the $j^{th}$ rating;
$q_i$=the probability that a randomly chosen member of the population will assign the $i_{th}$ rating.

In this particular example, the i's range from 1 to 9 since there are nine possible ratings for the movie. For example, to compute the transformed rating for the ninth rating (i.e., four stars), j=9 and the summation in Equation 6 goes from 1 to 9. Table IV below shows the transformed rating values $r_{Tj}$ for each of the ratings for the movie in question.

TABLE IV

| Rating r (star system) | Percentage of Population (%) | Transformed Rating ($r_{Tj}$) |
|---|---|---|
| no stars | 3 | .03 |
| 1/2 star | 4 | .07 |
| * | 10 | .17 |
| *1/2 | 13 | .30 |
| ** | 15 | .45 |
| **1/2 | 17 | .62 |
| *** | 20 | .82 |
| ***1/2 | 12 | .94 |
| **** | 6 | .0 |

The transformed ratings can then be randomized by adding a uniformly distributed random number to each transformed rating to form randomized transformed ratings (RTRs). The random number is uniformly distributed between zero and the percentage of the population that assigned a particular rating. As is discussed at later time, only the range of possible RTRs need be ascertained. It is not necessary to compute the actual RTRs but it is helpful in understanding the invention. The RTR can be a random variable defined as follows:

$$R_j = \begin{cases} U_j & \text{if } j = 1 \\ r_{T(j-1)} + U_j & \text{if } j > 1 \end{cases} \qquad \text{Equation 7}$$

in which $U_j$ is a uniformly distributed random variable between zero and the percentage of the population that assigned rating j.

TABLE V

| Star Rating | Percentage of Population | Transformed Rating | Random Number Upper Limit | Typical RTR |
|---|---|---|---|---|
| no stars | 3 | .03 | .03 | .0257 |
| 1/2 star | 4 | .07 | .04 | .0412 |
| * | 10 | .17 | .10 | .1532 |
| *1/2 | 13 | .30 | .13 | .2597 |
| ** | 15 | .45 | .15 | .4368 |
| **1/2 | 17 | .62 | .17 | .4721 |
| *** | 20 | .82 | .20 | .7055 |
| ***1/2 | 12 | .94 | .12 | .8743 |
| **** | 6 | 1.0 | .6 | .9871 |

The exact upper limits of the range of possible RTRs themselves are excluded.

Median transformed ratings (MTR's) are then computed to locate a rating given by the first user in the median of the group associated with a particular rating. The MTRs are defined as follows:

$$T_{Mj} = \begin{cases} .5 * r_{Tj}, & \text{if } j = 1 \\ r_{T(j-1)} + .5 * (r_{Tj} - r_{T(j-1)}), & \text{if } j > 1 \end{cases} \qquad \text{Equation 8}$$

A MTR column is then added as shown in Table VI:

TABLE VI

| Star Rating | Percentage of Population | Transformed Rating | Random Number Upper Limit | Typical RTR | MIR |
|---|---|---|---|---|---|
| no stars | 3 | .00 | .03 | .0257 | .015 |
| 1/2 star | 4 | .03 | .04 | .0412 | .05 |
| * | 10 | .07 | .10 | .1532 | .12 |
| *1/2 | 13 | .17 | .13 | .2597 | .235 |
| ** | 15 | .30 | .15 | .4368 | .375 |
| **1/2 | 17 | .45 | .17 | .4721 | .535 |
| *** | 20 | .62 | .20 | .7055 | .67 |
| ***1/2 | 12 | .82 | .12 | .8743 | .88 |
| **** | 6 | .94 | .6 | .9871 | .97 |

It will thus now be appreciated that if users and movies are selected at random from the database, the randomized transformed ratings (RTR's) as defined above have a uniform distribution on an interval [0,1], at least to the extent that the assumptions about the overall distribution of discrete ratings for the given movie are accurate. Performance improves as the number of entries in the database increases.

Now defining p as the probability, with respect to a particular movie, that a randomly-chosen third user's RTR will be at least as close to Joe's MTR as Martha's RTR is, let j represent Joe's MTR for this movie and let m represent Martha's RTR. Then p the probability can be computed as follows:

$$p = \begin{cases} 2|(m-j)|, & \text{if } |m-j| \leq \min(j, 1-j) \quad \text{Case 1} \\ m, & \text{if } j < m, \text{ and not Case 1} \quad \text{Case 2} \\ 1-m, & \text{if not Case 1 or Case 2} \quad \text{Case 3} \end{cases} \quad \text{Equation 9}$$

Let Q be a random variable which takes on Martha's possible RTR's; let P be a random variable that takes on the values of the corresponding p's. For any fixed j, P takes on a uniform distribution on the closed unit interval if Q is uniformly distributed on that interval. And, under the null hypothesis, any RTR is uniformly distributed, so Q is. It is shown below that P takes on a uniform distribution on the closed unit interval.

In order to prove that a random variable is uniformly distributed on a certain interval, it is sufficient to show that it is just as likely to assume a value in one subinterval as it is to assume a value in any other subinterval of equal size. We will show that the probability of assuming a value in a subinterval of length $\alpha$ is $\alpha$; of course, this will prove the proposition that P takes on a uniform distribution on the closed unit interval.

Assume $A = [\alpha_1, \alpha_2]$ is a subinterval of the unit interval such that $\alpha_2 - \alpha_1 = \alpha$. Let C be the set of points on the unit interval that are "close" to j. By close, we mean that $C = \{C \in [0,1] | |j-c| \leq \min(j, 1-j)\}$.

Let F be the set of points on the unit interval that are "far" from j. In other words, $F = \{f \in [0,1] | f \notin C\}$.

There are three cases to consider.

1) $A \subset F$.

There are two subcases to this case.

If $j < \frac{1}{2}$, then P is in A if and only if Q is in A.

If, on the other hand, $j \geq \frac{1}{2}$, then P is in the interval $[\alpha_1, \alpha_2]$ if and only if Q is in the interval $[1-\alpha_1, 1-\alpha_2]$. Either way, the probability of P being in A is $\alpha$.

2) $A \subset C$.

In order for P to take on a value on the interval A when $A \subset C$, Q must take on a value in either one of the following two intervals:

$$\left[ j - \frac{a_1}{2}, j - \frac{a_2}{2} \right]$$

or $$\left[ j + \frac{a_1}{2}, j + \frac{a_2}{2} \right];$$

and there is no other way P can take on a value in A. Now, due to the fact that Q is uniformly distributed on the unit interval, the probability of Q being in one or the other of these two intervals is $$\frac{a}{2} + \frac{a}{2} = a.$$

3) $A \cap C \neq \emptyset$ and $A \cap F \neq \emptyset$.

In other words, A is partly in one interval and partly in the other.

In that case, we can divide A into two subintervals and consider them separately as above. Let $A_C = [\alpha_{C1}, \alpha_{C2}]$ be $A \cap C$, and let $A_F = [\alpha_{F1}, \alpha_{F2}]$ be $A \cap F$.

Then the probability of P falling in A is Prob $(P \in A_C)$+Prob $(P \in A_F)$. Now, the argument for (2) above shows that $$\text{Prob}(P \in A_C) = \text{Prob}\left( P \in \left[ j - \frac{a_{C1}}{2}, j - \frac{a_{C2}}{2} \right] \right) +$$

$$\text{Prob}\left( P \in \left[ j + \frac{a_{C1}}{2}, j + \frac{a_{C2}}{2} \right] \right) = a_{C2} - a_{C1}.$$

Similarly, the argument for (1) above shows that Prob $(P \in A_F) = \alpha_{F2} - \alpha_{F1}$. Then, since $(\alpha_{C2} - \alpha_{C1}) + (\alpha_{F2} - \alpha_{F1}) = \alpha$, it is proved.

Because the probability p is uniformly distributed on the unit interval, the probability p can be interpreted to be a p-value. Let $\Phi$ be the standard normal cumulative distribution function; in other words, if Z is a z-score, then $\Phi(Z)$ is a p-value. The inverse of this function can also be used. That is, if q is a p-value, then $\Phi^{-1}(q)$ is a z-score.

An expected Z-score can then be calculated. Let $S = [S_1, S_2]$ be a closed subinterval of the unit interval. Let each point $s \in S$ be a p-value. To every point s there corresponds a z-score, given by $\Phi^{-1}(s)$.

Let $y_1 = \Phi^{-1}(s_1)$ and $y_2 = \Phi^{-1}(s_2)$.

Let Z denote a random variable representing the z-scores generated by points on S.

As is known to one of ordinary skill in the art, the expected (mean) value of such z-scores is given by $$E(Z) = \frac{e^{-\frac{1}{2} y_1^2} - e^{-\frac{1}{2} y_2^2}}{\sqrt{2\pi} (s_2 - s_1)}. \quad \text{Equation 10}$$

The previously calculated p's occur on a subinterval of the unit interval. This subinterval is determined by the ratings provided by Joe and Martha. For instance, using the earlier example and the values from Tables II–V, if Joe rated the current move 1 star and Martha assigned it 4 stars then, Joe's MTR is 0.12 and Martha's RTR is on the interval [0.94,1). It should be noted that the upper limit, here 1, is not included in the interval. Thus, the probability that a randomly chosen third users RTR will be at least as close to MTR as Martha's RTR defined as p is also on the interval [0.94,1). Setting $s_1 = 0.94$ and $s_2 = 1$, we have $y_1 = 1.55$ and $y_2 = \infty$.

Then the expected mean is computed as:

$$E(Z) = \frac{e^{-1.2} - e^{-\infty}}{\sqrt{2\pi}\ (1-.94)} = \frac{.3 - 0}{.06\sqrt{2\pi}} = 2.$$

In the case where Joe assigned the movie 1 star and Martha assigned it 4 stars, evaluating E(Z) is straightforward. Sometimes, however, there is somewhat more complexity.

Figure 7:
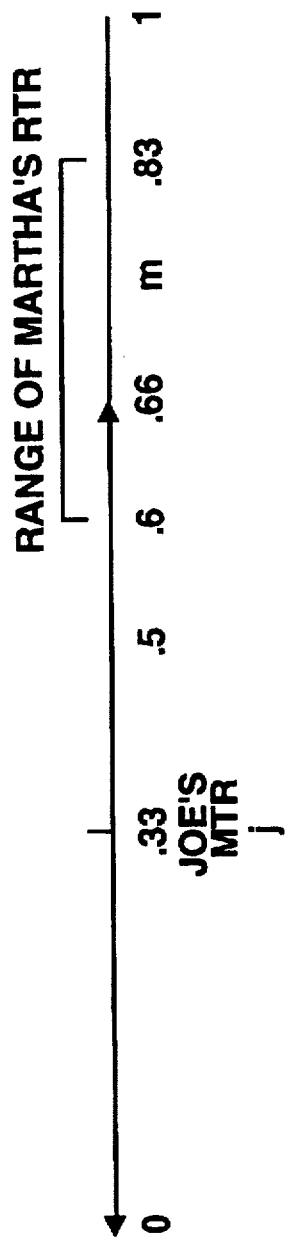
FIG. 7 is a graphical representation of ratings used in the ACF system of FIG. 6.

Referring now to FIG. 7, a diagram illustrating a range of RTR's and MTR's is shown. Once again, let j be Joe's MTR and m be a possible RTR for Martha. Between 0 and Joe's MTR (0.33), p is 2(j-m). Between 0.33 and 0.66 (indicated by the right angle bracket), p is 2(m-j). Between the right angle bracket and 1, p is m. Assume Martha has assigned a star rating consistent with the RTR-range shown in the diagram: 0.6 to 0.83. Then between 0.6 and 0.66, p is 2(m-j) and between 0.66 and 0.83, p is m.

Now, the calculation for E(Z) is based on the assumption that p has a uniform distribution on the segment $S=[s_1,s_2]$. However, setting $s_1$ to 0.6 and $s_2$ to 0.83, the distribution would not be uniform because of the two different expressions used for p in that segment. Therefore, the expected mean value E(Z) is evaluated in two parts. First, the segment [0.6, 0.66] is evaluated and then the segment [0.66, 0.83] is evaluated. The results are $E(Z_1)$ and $E(Z_2)$, respectively.

From Equation 9 above, the range of p in the first segment is $s_1=2(0.6-0.33)=0.54$ to $s_2=2(0.66-0.33)\times 0.66$. then $y_1=\Phi^{-1}(0.54)=0.1$ and $y_2=\Phi^{-1}(0.66)=0.41$. So $$E(Z_1) = \frac{e^{-\frac{1}{2}.1^2} - e^{-\frac{1}{2}.41^2}}{\sqrt{2\pi}\ (.66 - .54)} = \frac{.995 - .919}{.3} = .251.$$

Similarly, the range of p in the second segment is $s_1=2(0.66-0.33)=0.66$ to $s_2=0.83$. Then $y_1=\Phi^{-1}(0.66)=0.41$ and $y_2=\Phi^{-1}(0.83)=0.95$. So $$E(Z_2) = \frac{e^{-\frac{1}{2}.41^2} - e^{-\frac{1}{2}.95^2}}{\sqrt{2\pi}\ (.83 - .66)} = \frac{.919 - .637}{.426} = .663.$$

The last step in calculating E(Z) involves computing a weighted average of the two expected values that takes account of the probability of a particular RTR falling into each segment. The probability of falling into the first segment (since it is known that the RTR is between 0.6 and 0.83) is $$\frac{.66 - .6}{.83 - .6} = .26.$$

The probability of falling into the second segment is $$\frac{.83 - .66}{.83 - .6} = .74.$$

So
$E(Z)=0.26E(Z_1)+0.74E(Z_2)=0.26(0.251)+0.74(0.663)=0.556.$

Suppose Joe and Martha have seen n movies. Each of those movies provides some evidence regarding the question of whether Joe and Martha have some similarity of tastes. This evidence can be combined into one numeric measure. If $z_1, z_2, \ldots, z_n$ are z-scores, a 6-15 combined z-score, $Z_c$, may be computed as follows:

$$z_c = \frac{z_1 + z_2 + \ldots + z_n}{\sqrt{n}}$$

Let $Z_c$ be a random variable representing the combinations of the Z's defined above for each of the n movies seen by Joe and Martha:

$$Z_c = \frac{Z_1 + Z_2 + \ldots + Z_n}{\sqrt{n}}$$

Then $$E(Z_c) = \frac{E(Z_1) + E(Z_2) + \ldots + E(Z_n)}{\sqrt{n}}$$

$E(Z_c)$ is a measure of the amount of evidence that Joe and Martha have some commonality of tastes. $E(Z_c)$ is negative when there is evidence of similarity of tastes; the more negative, the more evidence. To see this, consider the following. $\phi(Z_c)$ is a p-value relative to the null hypotheses. If $\phi(Z_c)$ is near 0, then we can reject the null hypothesis with confidence and conclude that the two users are very likely to have an unusual similarity of taste.

But the $\phi$ function is monotonic. For example, $\phi(Z_x)<\phi(Z_y)$ if and only if $Z_x<Z_y$.

Therefore, for comparative purposes, $Z_x$ serves us just as well as $\phi(Z_x)$. That is, we are interested in determining which users have the most measured similarity to Joe as determined by the calculated p-values relative to each of those users. But, we do not need to actually calculate the p-values, since lower p-values always correspond to lower z-scores. By comparing Z-scores, we achieve the same effect as we would by comparing p-values.

The combined z-score is relative to a combined null hypothesis, which says: The two users have no unusual similarity of taste relative to movies like any of the movies they have both seen and rated.

The reasons $E(Z_c)$ is a particularly appropriate measure of similarity are as follows:

1) $E(Z_c)$ is sensitive to the fact that Joe and Martha's agreeing with most other people is less meaningful than Joe and Martha's agreeing with each other but with few other people. For instance, suppose that Joe and Martha both assigned 4 stars to the movie in the example, only 6% of the population agrees with them. Then $$E(Z) = \frac{e^{-\infty} - e^{-\frac{1}{2}1.56^2}}{\sqrt{2\pi}\ (.06 - 0)} = \frac{0 - .296}{.15} = -1.97.$$

Now suppose they each assigned 2½ stars. 17% of the population agrees with them:

$$E(Z) = \frac{e^{-\infty} - e^{-\frac{1}{2}.95^2}}{\sqrt{2\pi}\ (.17 - 0)} = \frac{0 - .637}{.426} = -1.5.$$

So Joe and Martha are considered to have more evidence for similarity with respect to the movie in question if they both rated it 4 stars, rather than both assigning 2½.

2) $E(Z_c)$ is sensitive to n. Suppose $E(Z_1)=E(Z_2)=E(Z_3)=-1.5$. Then $$E(Z_c) = \frac{E(Z_1) + E(Z_2) + E(Z_3)}{\sqrt{3}} = \frac{-1.5 - 1.5 - 1.5}{\sqrt{3}} = -2.6.$$

Now suppose n is 4, but the E(Z)'s are all still −1.5. Then we have $$E(Z_c) = \frac{-1.5 - 1.5 - 1.5 - 1.5}{\sqrt{4}} = -3.$$

So, in this case, greater n shows more evidence of similarity.

3) Unlike nonparametric solutions such as a binomial distribution, $E(Z_c)$ is very sensitive to the values of each data point that is being combined. Suppose $E(Z_1)=E(Z_2)=E(Z_3)=-1.5$, and $E(Z_4)=-1.6$. Then $$E(Z_c) = \frac{-1.5 - 1.5 - 1.5 - 1.6}{\sqrt{4}} = -3.05.$$

So this example would be considered to be more indicative of similarity of taste than the case where all the E(Z)'s are −1.5, which results in $E(Z_c)=-3.0$. A nonparametric solution might ignore that difference.

4) $E(Z_c)$ has a real statistical meaning.

5) As will be detailed below, the techniques described here can be modified to allow optimization of calculations in such a way to generate a rating prediction for Joe for a particular movie, finding the people who will be best to use in computing an accurate predicted rating for that particular movie.

In certain low-data-volume situations, it will be practical to optimize the similarity measure for predicting a rating for a particular movie. (Such situations would be more likely to apply to recommending restaurants or doctors than mass-market situations like movies, but for simplicity, we'll continue using the movie example. The reason it might be impractical for applications such as movies is that it would take a lot of CPU time to find a completely different group of "most similar people" for Joe for each movie. Perhaps at some future date, however, improved processor speeds will make it practical.)

Instead of using $E(Z_c)$ as our similarity measure, $E(Z_w)$ is used, which is based on a weighted combination of z-scores. Let $v_1, v_2, \ldots, v_n$ be weights associated with the n movies seen and rated by both Joe and Martha. Let $Z_1, Z_2, \ldots, z_n$ be z-scores relative to Joe's MTR and Martha's RTR for each movie. Then $$Z_w = \frac{v_1 Z_1 + v_2 Z_2 + \ldots + v_n Z_n}{\sqrt{v_1^2 + v_2^1 + \ldots + v_n^2}}$$

is also a z-score. It provides a weighted average of the other z-scores.

Relative to the random variables $Z_1, Z_2 \ldots Z_n$ which correspond to the range of possible values for Martha's RTR as determined by the ratings assigned by Joe and Martha, then $$E(Z_w) = \frac{v_1 E(Z_1) + v_2 E(Z_2) + \ldots + v_n(Z_n)}{\sqrt{v_1^2 + v_2^2 + \ldots + v_n^2}}$$

To take advantage of $E(Z_w)$, there is a need to compute weights for each movie. These weights should be based on similarities between movies. When the aim is to predict Joe's rating for the third entry in the Star Wars trilogy, the first two entries in that series should obviously have relatively high weights. Ingmar Bergman's Cries and Whispers, on the other hand, would probably be given a low weight.

As is understood by one of ordinary skill in the art, weights can be determined by a large number of different procedures and be within the scope and spirit of the present invention.

One important thing to note is that $Z_w$ is still a z-score no matter what weights are used, so there is considerable flexibility with regard to the choices for algorithmic tools to calculate those weights. Even without a mathematically/statistically sophisticated algorithm, the results will be still be correct, if not optimal.

The following is a description of one simple way to calculate suitable weights; however it should be in no way construed that the present invention is limited to the use of this particular algorithmic device.

Let $M_1$ and $M_2$ be two movies. For these calculations, assume "ordinal ratings," this is, integers from 1 to m where m is the total number of possible ratings. (For the movie example, there are 9 possible ratings from 0 stars to 4 stars.) Let $r_{11}, r_{12}, \ldots, r_{1s}$ be the ordinal ratings for $M_1$ provided by the users who rated both movies, and let $r_{21}, r_{22}, \ldots, r_{2s}$ be their ordinal ratings for $M_2$. Then the similarity between the movies, $S(M_1, M_2)$, is based on the mean square distance between ordinal ratings and is given by $$S(M_1, M_2) = \frac{1}{\left( \left( \sum_i (r_{1i} - r_{2i})^2 \right) / S \right)}$$

$S(M_1, M_2)$ would be a reasonable candidate for the weight to use when using $M_1$ in calculating similarities between Joe and other users for the purpose of predicting Joe's rating of $M_2$, and vice-versa.

However, it is very likely that a monotonic transformation of $S(M_1, M_2)$ could be found that would result in a higher-performing set of weights.

Genetic algorithms can be used to generate this transformation, as described elsewhere in this specification. A genetic algorithm would create a table to be stored in RAM which would allow the transformation of each $S(M_1, M_2)$ into the appropriate weight.

The combining technique thus described, based on z-scores, is not the only possible technique one can use to combine a number of p-values into a single value for use as a similarity measure. A number of other methods can be used. This invention should not be construed to be limited to embodiments that use those particular combining methods.

In an alternative embodiment to the binomial and Z-score distributions described above used to determine a similarity value, a Chi-Square distribution can be used. This embodiment presents an alternative technique for finding a distance measure. The process steps include calculating a test statistic for each item seen by Joe and Martha, summing the test statistics, and then calculating the similarity value based on the test statistics.

The null hypothesis used here says that the two users, Joe and Martha have no unusual tendency to agree or disagree. Thus, under the null hypothesis, their ratings are random with respect to one another. The alternative hypothesis is that the two users have a tendency to agree and thus would have a low p-value to be obtained in this case.

A random variable R comprised of this test statistic has a chi-square distribution with 2 degrees of freedom when P is a uniformly distributed random variable. (Under the null hypothesis, P is uniformly distributed.) R is defined as follows:

$$R = 2\ln(1-P)$$

A sum of chi-square random variables is also a chi-square random variable. So R is treated in a manner analogous to the treatment of Z in the technique based on the normal distribution. To be specific: if Joe is the user for whom the system is interested in finding nearest-neighbors with regard to similarity of tastes, and Martha is a potential neighbor, then the system computes Joe's MTR and the range of Martha's possible RTR's, and then computes the mean value for R where P depends, as in the case of the earlier method, on that range.

Let $R_c$ be the sum of the R's for all items rated by both Joe and Martha. $R_c$ has a chi-square distribution with $2n$ degrees of freedom where n is the number of items they have both rated.

Let $S=[s_1, s_2]$ be a closed subinterval of the unit interval, where $s_1$ and $s_2$ represent the lower and upper bounds, respectively, for the expression (1-P) as determined by Joe's MTR and the range of Martha's possible RTR's for a particular item. (1-P) and P are both p-values, since they are both uniformly distributed under the null hypothesis, but (1-P) is nearer one when the two users give similar ratings and P is nearer to zero.

In order to obtain a random variable R, a uniform random number is chosen on the interval S and R is calculated accordingly. Using the chi-square distribution with $2n$ degrees of freedom, the system calculates an associated p-value. Note that p-values can be obtained from the probabilities of being either in the lower tail or upper tail of the chi-square distribution. By obtaining the p-value associated with the lower tail, the p-value will be nearer to 0 when Joe and Martha give similar ratings. Thus, by using the lower tail, significant p-values will enable rejection of the null hypothesis in favor of the alternative hypothesis that the two users do have unusual similarity of tastes. Thus, this p-value can be used as a similarity measure, and values closer to 0 are considered more significant. Let's call this similarity measure M.

Alternatively, the system can approximate M without the actual use of random numbers. The first step is to approximate the mean of R, E(R), that the system would ending up with by using the random number method a very large number of times. This is the same technique as was used earlier in the normal-curve method. The more times the random number method is run, the more closely the mean will approach the expected value calculated as shown below. It can be shown that $$E(R) = 2 - \frac{2(s_2 \ln s_2 - s_1 \ln s_1)}{s_2 - s_1}$$

Furthermore, since $$E(R_c) \cong \Sigma E(R),$$

the mean of $R_c$ is known.

The system then uses a chi-square table or equivalent software method to derive the p-value associated with $E(R_c)$. This p-value can be considered to be an approximation to $E(M)$, the mean of the values the system would compute if M is calculated a large number of times using the random method. The approximation given by the p-value associated with $E(R_c)$ is effective in practical usage and reliably finds nearest neighbors to Joe who actually are highly similar to Joe in taste.

In another embodiment of the present invention, an ACF system provides reviews of an item stored in a database in an order corresponding to similarity values of a first user and other users in the database. As an example, suppose a user of one of the above-named systems (call him Joe) wants the system to recommend a music CD to buy. To answer this request, the system looks for other people in the database who have similar tastes to Joe's. This judgment of similarity is based wholly on the ratings data provided by the users. Optionally, other data such as age, sex, and income level could be incorporated into this search. Similarly, meaningful information about a user's taste could be gleaned by simply asking him such questions as "Do you like rock music? Jazz?" etc. However, relying only on ratings data has the advantage that it is less intrusive—it doesn't require the user to fill out a questionnaire or give information, such as age, that might be considered to be personal in nature.

The system then considers those people whose tastes are the most similar to Joe's out of the entire database. What CD's do they tend to like that Joe hasn't seen yet? As in the previous examples, based on this information, a recommendation is made, or a list of recommendations is given.

However, in addition to the list of recommendations, many users would also like to see reviews of the recommended item. These reviews could be voluntarily supplied by the users of the system. There is a system on the World Wide Web called Firefly and which recommends music CD's. Firefly accepts user-written reviews and incorporates them into the service for later viewing by other users. As such a service expands to a very large number of users, certain well-known artists and/or albums will have a large number of user-written reviews associated with them.

Suppose Joe wants to see some reviews of a recommended album. The question arises: which reviews should be displayed first? If there are many reviews, this is an important question, since he will probably only read a few of them. The reviews are ordered by using the calculated similarity of tastes between Joe and the reviewer. This similarity measure could be the one calculated during the before described ACF process of determining which users are closest to Joe for the purpose of making recommendations. Alternatively, the similarity value could be calculated again for the ordering of reviews, perhaps using a different similarity measure.

Optionally, the user could also be given the opportunity to rate the reviews he reads. If Joe doesn't like the way a particular reviewer writes his reviews, he may not want to read them even if the reviewer has very similar tastes to Joe's. If the user is enabled to rate reviews, then two factors need to be taken into account: the calculated similarity of taste between Joe and the reviewer, and Joe's ratings of other reviews by that reviewer.

For example, the system allows Joe to rate the reviews he reads on a scale of 1 to 5. These ratings are stored in a database for later use. The system needs to know how to order a list of reviews pertaining to a particular artist. For each review of that artist, it considers Joe's average rating of the other reviews by that reviewer (call this quantity A). The calculation is based on whatever reviews by that reviewer Joe has rated; it may only be a small percentage of the total number of reviews by that reviewer.

All reviews with A=5 will be positioned on the list before all other reviews. We also need to define an ordering for the A=5 reviews. The system orders them in sequence of the reviewer's calculated similarity to Joe, with the greatest degree of similarity first.

After the A=5 reviews, it presents the A=4 reviews. Again, these are ordered in sequence of the reviewer's calculated similarity to Joe. Then the system presents reviews for which A can't be calculated because Joe hasn't rated any reviews by that reviewer. Again, these are ordered in sequence of the reviewer's calculated similarity to Joe. Then it presents the A=3 reviews in similarity sequence, then the A=2 reviews in that sequence, and finally the A=1 reviews in that sequence.

As can be appreciated there are other such ways to consider the similarity between Joe and the reviewer as well as Joe's ratings of the reviewer's other reviews. For example, suppose again that reviews are rated 1 to 5. Again, the average of Joe's ratings of other reviews by the same reviewer is called A. First, the system sorts the reviews in sequence of the reviewer's similarity to Joe (the review of the most similar reviewer is first, etc.) Suppose N is the total number of reviews for the artist or album and i is the review's position on the similarity-based list. (For the review of the most similar reviewer, i=1; etc.)

The goodness, G, of a review is defined as follows. If A can be calculated for the review in question, then G=A+((5 * (N−i+1))/N). Otherwise, G=(10 * (N−i+1))/N. G will be between 1 and 10. The system would then present the reviews in order of G such that the highest G comes first, the next highest G comes second, etc.

In a further embodiment, an ACF system in accordance with the present invention used the above described techniques based on the normal curve or the chi-square distribution or other distributions to derive a goodness measure. For example, it is desired to calculate a goodness measure for a particular item, which, for instance, could be an article in a Usenet newsgroup. Suppose a number of users have provided ratings for this item. Furthermore, suppose the overall distribution of ratings obtained from each user has been calculated. Note that in the techniques for calculating similarities between users, the overall distribution of ratings for each item is calculated. The calculations are similar in the present case, but instead of calculating the distribution of ratings for each item, the distribution of ratings for each user is calculated.

The calculation procedure is then the same as for the computations regarding similarity, with the following exceptions: In the similarity-calculating technique, the p-value for one item, is derived by considering the difference between Joe's and Martha's ratings in the context of the overall distribution of ratings, from all users, for that item. But in the present technique, the p-value is found by looking at the current user's rating for the item in question in the context of his overall distribution of ratings for all items he has rated.

Using the p-value found in this way, a test statistic is calculated, as in the other technique, and the system uses the same mathematical methods to combine those test statistics into an overall measure of goodness. A chi-square technique is used for illustration, but the same principles apply to using the normal curve and other techniques.

Suppose a particular user's overall distribution of ratings for all items he has rated is as follows:

| Stars | Percentage of Ratings | Cumulative Percentage |
|---|---|---|
| no stars | 2 | 2 |
| 1/2 star | 5 | 7 |
| * | 3 | 10 |
| *1/2 | 7 | 17 |
| ** | 9 | 26 |
| **1/2 | 24 | 50 |

-continued

| Stars | Percentage of Ratings | Cumulative Percentage |
|---|---|---|
| *** | 22 | 72 |
| ***1/2 | 17 | 89 |
| **** | 11 | 100 |

The system processes each rating for the item in question. If the current user has the distribution of ratings shown in the table and has rated the current item 3½ stars, then, referring back to the discussion of the chi-square technique, pick $s_1=0.72$ and $s_2=0.89$. Then the system computes the mean value of the related chi-square random variable R, as before, with the equation $$E(R) = 2 - \frac{2(s_2 \ln s_2 - s_1 \ln s_1)}{s_2 - s_1}.$$

The ratings from all raters of a particular item are combined into one overall measure of its goodness. To do so, take the same approach as in measuring similarity. Calculate the mean of the sum of the R's, $R_c$. It is noted that $$E(R_c) \Sigma E(R).$$

Under the null hypothesis, $R_c$ has a chi-square distribution with 2n degrees of freedom, where n is the number of people who have rated the item in question.

Thus, the system computes a p-value relative to $R_c$ by calculating the area under the lower tail of the chi-square curve; the p-value associated with $E(R_c)$ is a measure of goodness. The nearer this p-value is to 0, the more confidence is provided that the item would be considered by a randomly chosen user to be higher-quality.

With respect to the implementation of the ACF system of the present invention, some users may not want to have their ratings stored in a central database. They may feel that doing so infringes on their privacy. In situations such as the World Wide Web where the user's computer is in communication with a central server, instead of storing Joe's ratings in the central server, they could be stored in his own computer. To find out which users are closest to him in taste, the ratings of different users could be uploaded into Joe's own computer, and comparisons could be made there. For instance, a Java applet could do the computations.

In order to avoid the need to send the ratings of thousands of users into Joe's machine, cluster analysis could be used to create clusters, and only those clusters would need to be sent into Joe's machine. If the particular algorithm requires additional information beyond the clusters themselves, then that can be sent after it is determined which cluster(s) Joe is closest to. Joe's computer would then do the required computations to generate recommendations.

One of ordinary skill in the art will realize further features and advantages of the invention from the above-described embodiments. Accordingly, the invention is not to be limited by what has been particularly shown and described, except as indicated by the appended claims. For example, other methods may be used to derive a test statistic from a p-value, and other corresponding methods may be used to combine those test statistics into an overall measure of similarity or goodness. All references cited herein are expressly incorporated by reference in their entirety.

APPENDIX

```
        typedefs.h
*/
typedef unsigned char Rating_t;
// Type Distrib_t is used in this code as a RAM-efficient alternative
// to floating point. A practical application will store the distribution
// of ratings for each item to be recommended; this can take up a great
// deal of RAM when there are a large number of items.
// Type DistribFormatPValue_t is used when, for convenience,
// the same idea is used to temporarily store a p-value.
typedef unsigned short Distrib_t;
typedef unsigned short DistribFormatPValue_t;
typedef double
          PValue_t;
#define DISTRIB_RANGE
        65535
/*
        main.cpp
*/
// The ComputeExpectedMinus2LnHelper of this program is to present a working
// implementation of the key concepts relative to this
// invention.
// We assume that the distribution of ratings for each
// item for which recommendations are desired have been
// calculated elswhere (for the sake of this example,
// the distributions are "hardcoded" into the main( )
// function).
// The ComputeExpectedMinus2LnHelper of this algorithm is to generate a
// similarity measure which is based on probability
// theory.
// It takes into account the a) tendency for two users
// to provide similar ratings for items, b)
// the overall distribution of ratings for each item
// and c) the number of items the users have common.
// Two variants of the algorithm are embodied
// in the code. The first variant computes E(Zc), which
// uses the normal distribution to generate a similarity
// measure. The second variant computes a p-value using
// a chi square distribution; the resulting p-value
// is the similarity measure.
// The second variant is the preferred embodiment.
#include <stdlib.h>
#include <math.h>
#include <iostream.h>
#include "typedefs.h"
// If d is a value of type Distrib_t, then d is equivalent
// to a floating point value of value d / DISTRIB_RANGE. For instance, if
// d is 32767, then that is treated logically as if it
// were a floating point value of .5. In order to accomplish this,
// divisions by DISTRIB_RANGE are carried out where necessary.
#define DISTRIB_RANGE 65535
#define min(a, b) (((a) < (b)) ? (a):(b))
#define NUM_ITEMS 5
struct RatingPair_t
{
        Rating_t joeRating, marthaRating;
};
/*
        The following 4 declarations are for external functiotis for performing
        statistical and mathematical calculations. These may be programmed
        by anyone familiar with statistical and mathematical programming.
*/
// ChiSq2PValue( ) converts a chiSq variate with df degrees of
// freedom into its p-value.
double ChiSq2PValue(const double chiSq, const double df);
// Z2P( ) converts a z-score to its corresponding p-value (i.e., the probability
// that a randomly chosen Z will be less than z.
double Z2P(double z);
// P2Z is the inverse of Z2P.
double P2Z(double p);
// lookupPLnP( ) takes a p-value, given in Distrib_t format, and converts it to
// p * ln p; the outpoint is a double.
double lookupPLnP(Distrib_t x);
double      ComputeExpectedZOneMovie(
                Rating_t R1,
                Rating_t R2,
                const Distrib_t * pDist);
void        GetRange(
                Rating_t iR,
```

APPENDIX

```
                    const Distrib_t * pDist,
                    Distrib_t & LowerBound,
                    Distrib_t & UpperBound);
double      ComputeExpectedLnOneMovie(
                    Rating_t iR1,
                    Rating_t iR2,
                    const Distrib_t * pDist);
double      ComputeExpectedMinus2LnHelper(
                    Distrib_t LowerBound,
                    Distrib_t UpperBound);
double      ProcessRatings(
                    RatingPair_t * RatingPairs,
                    Distrib_t aaDist[NUM_ITEMS] [5],
                    double (P2Stat)(
                    Rating_t,
                    Rating_t,
                    const Distrib_t * pDist),
                    double (StatSum2P)(double, int));
                    double LnSum2P(double sum, int count);
                    double ZSum2Z(double sum, int count);
// main( ) contains an example of the use of the algorithm.
// aaDistrib is an array containing the overall distribution of ratings
// for each item.
// aRatings contains Joe's and Martha's ratings (in that order) for each item.
// (Joe is the person for whom we are trying to find nearest neighbors;
// Martha is a candidate nearest neighbor.)
// Two similarity measures are calculated and displayed in main( ). One
// is based on the normal distribution (using ComputeExpectedZOneMovie( )
// and ZSum2Z( )); the other is based on the chi square distribution
// (using ComputeExpectedLnOneMovie( ) and LnSum2P( )).
int main( )
{
    Distrib_t aaDistrib[NUM_ITEMS] [5]
       = {{ 12345, 24650, 51987, 61654, 65535 },
          { 864, 11937, 30154, 45000, 65535 },
          { 20534, 31563, 52432, 62867, 65535 },
          { 18456, 35723, 55762, 60654, 65535 },
          { 13948, 25723, 40789, 55329, 65535 }};
    RatingPair_t aRatings[NUM_ITEMS]={{ 1, 1 }, { 4, 3 }, { 3, 4 }, {2, 3 }, { 4, 4 }};
    // The technique using the chi square distribution is the preferred
    // similarity measure.
        cout << "Similarity measure based on the chi square distribution:"
            << ProcessRatings(aRatings,
                        aaDistrib,
                        ComputeExpectedLnOneMovie,
                        LnSum2P)
        << endl;
        cout << "Similarity measure based on the normal distribution:"
            << ProcessRatings(aRatings,
                        aaDistrib,
                        ComputeExpectedZOneMovie,
                        ZSum2Z)
        << endl;
        return 0;
}
double LnSum2P(double sum, int count)
{
// Here we derive a similarity measure based on the fact that, if
// p1, p2, . . . pn are p-values, then −2 * ln p1 + (−2 * ln p2)
// a p-value relative to the null hypothesis
// that the two users have no
        return 1 − ChiSq2PValue(sum, 2 * count);
}
double ZSum2Z(double sum, int count)
{
// Here we compute E(Zc), which is the z-score that results
// from combining multiple z-scores each of which is related
// to a particular item.
// If desired for a particular application, it would be
// possible using means familiar to those versed in the
// art of statistical programming to calculate a p-value
// relative to this expected z-score.
        return sum / sqrt(count);
}
double ProcessRatings(RatingPair_t * aRatingPairs,
            Distrib_t aaDist[NUM_ITEMS] [5],
            double (P2Stat)(Rating_t, Rating_t, const Distrib_t *),
            double(StatSum2P)(double, int))
```

APPENDIX

```
{
// Here we process the ratings associated with our NUM_ITEMS items.
// This function is very specific to this demonstration, since
// a real application would have some unknown number of items.
// This function takes functions as arguments so that different
// calculations can be done depending on the current algorithm.
        int i;
        double sum = 0;
        for(i = 0; i < NUM_ITEMS; i++)
        {
            double stat = P2Stat(aRatingPairs[i].joeRating,
                            aRatingPairs[i].marthaRating, &aaDist[i] [0]);
                    sum += stat;
        }
        double result = StatSum2P(sum, NUM_ITEMS);
        return result;
}
// Calculate the square root of 2 * pi.
static double s_dSqrt2Pi = sqrt(2 * acos(-1.0));
double ComputeExpectedMinus2LnHelper(
            DistribFormatpValue_t LowerBoundPValue,
            DistribFormatpValue_t UpperBoundPValue)
{
// Assuming that LowerBoundPValue and UpperBoundPValue are the lower and
// upper boundaries of the possible range of the p-value p (given the
// ratings supplied by Joe and Martha for the current item),
// this function calculates the mean value of -2 * ln p.
        UpperBoundPValue = DISTRIB_RANGE - UpperBoundPValue;
        LowerBoundPValue = DISTRIB_RANGE - LowerBoundPValue;
        PValue_t P
        = double(UpperBoundPValue) / DISTRIB_RANGE;
        PValue_t PPrime = double(LowerBoundPValue) / DISTRIB_RANGE;
        if(P == PPrime)
        {
// We are handling here an extremely unusual case which could
// only occur because of rounding depending on the
// specific implementation. If there is no difference
// between the computed P and PPrime, we don't need
// to compute the mean and attempting to do so
// would result in division by 0.
                return -2 * log(P);
        }
        double firstTerm = P * log(P);
        double secondTerm = PPrime * log(PPrime);
        double result = 2 - 2 * (firstTerm - secondTerm) / (P - PPrime);
        return result;
}
double ComputeExpectedZHelper(DistribFormatPValue_t LowerBoundPValue,
                            DistribFormatpValue_t UpperBoundPValue)
{
// Assuming that LowerBoundPValue and UpperBoundPValue are the lower and
// upper boundaries of the possible range of the p-value p (given the
// ratings supplied by Joe and Martha for the current item),
// this function calculates the mean value of the z-scores corresponding
// to the p-values.
        double y1 = P2Z(LowerBoundPValue / double(DISTRIB_RANGE));
        double dN1 = 1.0 / exp(0.5 * y1 * y1);
        double y2 = P2Z(UpperBoundPValue / double(DISTRIB_RANGE));
        double dN2 = 1.0 / exp(0.5 * y2* y2);
        double numerator = dN1 - dN2;
        double denominator =
            s_dSqrt2Pi * (double(UpperBoundPValue - LowerBoundPValue)/DISTRIB_RANGE);
                return numerator / denominator;
}
void GetRange(Rating_t iR, const Distrib_t * pDist,
            Distrib_t & LowerBound, Distrib_t & UpperBound)
{
            LowerBound = iR > 0 ? pDist[iR - 1]:0;
            UpperBound = pDist[iR];
}
double ComputeExpectedZOneMovie(Rating_t iR1, Rating_t iR2,const Distrib_t * pDist)
{
// This function calculates the mean, or expected, z-score relative to
// p-values associated with the ratings iR1 and iR2 provided by two
// users with regard to one item.
// iR1 is the user (Joe) for whom we are looking for nearest neighbors;
// iR2 (Martha) is a candidate nearest neighbor.
// compute R1's MTR
```

APPENDIX

```
            Distrib_t LowerBound, UpperBound;
            GetRange(iR1, pDist, LowerBound, UpperBound);
            if(iR1 == iR2) // special case
            return ComputeExpectedZHelper(0, UpperBound - LowerBound);
            Distrib_t j = (LowerBound + UpperBound) / 2;
// compute R2's range
            GetRange(iR2, pDist, LowerBound, UpperBound);
            if(j > DISTRIB_RANGE / 2)
            {            // reflect about center point
            j = DISTRIB_RANGE - j;
            Distrib_t NewLowerBound = DISTRIB_RANGE - LowerBound;
            Distrib_t NewUpperBound = DISTRIB_RANGE - UpperBound;
            UpperBound = NewUpperBound;
            LowerBound = NewLowerBound;
            }
            Distrib_t jLimit = 2 * j;
            if(UpperBound <= jLimit)
// R2's range within close region
                    return ComputeExpectedZHelper(2 * abs(LowerBound - j),
                            2 * abs(UpperBound - j));
            else if(LowerBound >= jLimit)
// R2's range within far region
                    return ComputeExpectedZHelper(LowerBound, UpperBound);
// R2's range overlapping both close and far regions
                    return ((jLimit - LowerBound)
                            * ComputeExpectedZHelper(2 * abs(LowerBound - j), jLimit)
                            + (UpperBound - jLimit)
                            * ComputeExpectedZHelper(jLimit, UpperBound))
                            / (UpperBound - LowerBound);
}
double ComputeExpectedLnOneMovie(Rating_t iR1, Rating_t iR2, const Distrib_t * pDist)
{
// This function calculates the mean, or expected, value for
// the expression (-2 * ln p) relative to
// p-values associated with the ratings iR1 and iR2 provided by two
// users with regard to one item.
// iR1 is the user (Joe) for whom we are looking for nearest neighbors;
// iR2 (Martha) is a candidate nearest neighbor.
// compute R1's MTR
            Distrib_t LowerBound, UpperBound;
            GetRange(iR1, pDist, LowerBound, UpperBound);
            if(iR1 == iR2)
// special case
            return ComputeExpectedMinus2LnHelper(Distrib_t(0), UpperBound
            -LowerBound);
            Distrib_t j = (LowerBound + UpperBound) / 2;
// compute R2's range
            GetRange(iR2, pDist, LowerBound, UpperBound);
            if(j > DISTRIB_RANGE / 2)
            { // reflect about center point
            j = DISTRIB_RANGE - j;
            Distrib_t NewLowerBound = DISTRIB_RANGE - LowerBound;
            Distrib_t NewUpperBound = DISTRIB_RANGE - UpperBound;
            UpperBound = NewUpperBound;
            LowerBound = NewLowerBound;
            }
            Distrib_t jLimit = 2 * j;
            if(UpperBound <=jLimit)
// R2's range within close region
                    return ComputeExpectedMinus2LnHelper(
                            Distrib_t(2 * abs(LowerBound - j)),
                            Distrib_t(2 * abs(UpperBound - j)));
            else if(LowerBound >= jLimit)
// R2's range within far region
                    return ComputeExpectedMinus2LnHelper(LowerBound, UpperBound);
// R2's range overlapping both close and far regions
                    double returnVal = ((jLimit - LowerBound)
                            * ComputeExpectedMinus2LnHelper(2 * abs(LowerBound - j), jLimit)
                            + (UpperBound - jLimit)
                            * ComputeExpectedMinus2LnHelper(jLimit, UpperBound))
                            / (UpperBound - LowerBound);
                    return returnVal;
}
```

What is claimed is:

1. A method of providing a recommendation of at least one item in a group of items to a first user in a group of users based on ratings of the item and other items in the group of items by other users in the group of users and ratings of at least some of the other items by the first user, comprising the steps of:

provid ing rating data for items in the group of items from at least some of the users in the group of users, wherein each item has a rating distribution based on the ratings by the at least some of the users in the group of users;

determining at least one item that the first user and a second user have provided ratings for;

determining transformed ratings for the at least one item based on the rating distribution of the at least one item;

determining a median transformed rating from rating provided by the first user for the at least one item based on the rating distribution;

determining a range of a randomized transformed rating for the rating of the at least one item provided by the second user;

determining a probability that a rating for the at least one item provided by a randomly chosen third user is at least as statistically close to the median transformed rating of the first user as the randomized transformed rating for the second user;

determining a test statistic for the first and second user from the probability; and determining a similarity value from the test statistic.

2. The method according to claim 1, wherein the similarity is calculated using a Z-score.

3. The method according to claim 1, wherein the similarity value is calculated using a chi-square distribution.

4. The method according to claim 1, wherein the test statistic is weighted.

5. The method according to claim 4, wherein the test statistic is weighted based on the similarity of items.

* * * * *